(12) United States Patent
Wang et al.

(10) Patent No.: US 11,558,833 B2
(45) Date of Patent: Jan. 17, 2023

(54) METHOD AND DEVICE FOR COMMUNICATING SYNCHRONIZATION SIGNAL

(71) Applicant: Samsung Electronics Co., Ltd., Suwon-si (KR)

(72) Inventors: Yi Wang, Beijing (CN); Yingyang Li, Beijing (CN); Min Wu, Beijing (CN); Shichang Zhang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 113 days.

(21) Appl. No.: 16/969,764

(22) PCT Filed: Feb. 13, 2019

(86) PCT No.: PCT/KR2019/001769
§ 371 (c)(1),
(2) Date: Aug. 13, 2020

(87) PCT Pub. No.: WO2019/160331
PCT Pub. Date: Aug. 22, 2019

(65) Prior Publication Data
US 2020/0413356 A1    Dec. 31, 2020

(30) Foreign Application Priority Data

Feb. 13, 2018  (CN) .......................... 201810150580.0
Jul. 17, 2018   (CN) .......................... 201810786427.7

(51) Int. Cl.
*H04W 56/00*   (2009.01)
*H04W 72/04*   (2009.01)

(52) U.S. Cl.
CPC ....... *H04W 56/001* (2013.01); *H04W 72/046* (2013.01)

(58) Field of Classification Search
None
See application file for complete search history.

(56) References Cited

U.S. PATENT DOCUMENTS

2013/0279437 A1* 10/2013 Ng .......................... H04W 48/12
                                                        370/329
2014/0204807 A1*  7/2014 Li .......................... H04L 1/0026
                                                        370/277

(Continued)

FOREIGN PATENT DOCUMENTS

WO    2016/186406 A1    11/2016
WO    2017/026985 A1     2/2017
WO    WO-2019096404 A1 *  5/2019  ............... H04L 1/20

OTHER PUBLICATIONS

Ericsson, On Beam Indication, Measurement, and Reporting, Oct. 2017, 3GPP TSG-RAN WG1 #90bis, R1-1718433, pp. 1-9. (Year: 2017).*

(Continued)

*Primary Examiner* — Nicholas Sloms
(74) *Attorney, Agent, or Firm* — Jefferson IP Law, LLP

(57) ABSTRACT

The present disclosure provides a method for transmitting a synchronization signal (SS), the method comprising: performing a listen-before-talk (LBT) operation in a pre-defined window; if the LBT operation succeeds, transmitting an SS block (SSB) in the window, wherein the SSB comprises the SS, or the SSB comprises the SS and a physical broadcast channel (PBCH). Compared with the prior art, the present disclosure may significantly improve the efficiency of data transmission and the access performance for the communication system by relaxing the time when the base station implements the LBT, that is, allowing the base station to implement the LBT in the pre-defined window and transmit the SSB after the LBT succeeds.

12 Claims, 16 Drawing Sheets

(56) References Cited

U.S. PATENT DOCUMENTS

| | | | |
|---|---|---|---|
| 2016/0219600 A1* | 7/2016 | Li | H04L 5/0057 |
| 2017/0019909 A1 | 1/2017 | Si et al. | |
| 2017/0251498 A1 | 8/2017 | Mukherjee et al. | |
| 2018/0083680 A1* | 3/2018 | Guo | H04L 5/0048 |
| 2018/0331860 A1* | 11/2018 | Bergman | H04L 5/0048 |
| 2019/0053235 A1* | 2/2019 | Novlan | H04L 5/001 |
| 2019/0379431 A1* | 12/2019 | Park | H04B 7/06 |
| 2020/0205095 A1* | 6/2020 | Strom | H04J 11/0076 |
| 2020/0221403 A1* | 7/2020 | Gao | H04W 72/005 |
| 2020/0288417 A1* | 9/2020 | Harada | H04W 74/0808 |
| 2020/0304256 A1* | 9/2020 | Park | H04L 5/0053 |
| 2020/0314946 A1* | 10/2020 | Tsuboi | H04W 76/27 |
| 2020/0336260 A1* | 10/2020 | Liu | H04L 27/2662 |
| 2020/0374060 A1* | 11/2020 | Wang | H04L 5/0023 |
| 2020/0404537 A1* | 12/2020 | Harada | H04W 28/06 |
| 2020/0404617 A1* | 12/2020 | Murray | H04W 52/0229 |
| 2021/0007086 A1* | 1/2021 | Liu | H04L 5/0094 |

OTHER PUBLICATIONS

ZTE, Discussion on Beam Management, Oct. 2017, 3GPP TSG-RAN WG1 #90-bis, R1-1717424, pp. 1-12. (Year: 2017).*
Ericsson, On Spatial QCL Definition, Jan. 2017, 3GPP TSG-RAN WG1 #87ah-NR, R1-1700771, pp. 1-5. (Year: 2017).*
Spreadtrum Communications; Discussion on the association between the SMTC and the measurement object; 3GPP TSG RAN WG1 Meeting 91; R1-1719689, Nov. 27-Dec. 1, 2017; Reno, USA.
NTT Docomo, Inc.; Remaining issues on Synchronization signal; 3GPP TSG RAN WG1 Meeting AH 1801; R1-1800649; Jan. 22-26, 2018; Vancouver, Canada.
NTT Docomo, Inc.; Remaining issues on measurement for mobility management; 3GPP TSG RAN WG1 Meeting AH 1801; R1-1800655; Jan. 22-26, 2018; Vancouver, Canada.
Samsung; Remaining details on QCL; 3GPP TSG RAN WG1#91; R1-1720315; Nov. 27-Dec. 1, 2017; Reno, USA.
European Search Report dated Feb. 24, 2021; European Appln. No. 19754260.8-1205 / 3738361 PCT/KR2019001769.

* cited by examiner

METHOD AND DEVICE FOR COMMUNICATING SYNCHRONIZATION SIGNAL

TECHNICAL FIELD

The present disclosure relates to wireless communication, and in particular, to a method and device for communicating a synchronization signal.

BACKGROUND ART

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

DISCLOSURE

Technical Solution

The present disclosure aims to overcome the defects of the prior art and provide a method and equipment for transmitting a synchronization signal with a desirable efficiency of data transmission.

In order to achieve the above objective, the present disclosure provide a method for transmitting a synchronization signal (SS), the method comprising the steps of: performing a listen-before-talk (LBT) operation in a pre-defined window; if the LBT operation succeeds, transmitting an SS block (SSB) in the window, wherein the SSB comprises the SS, or the SSB comprises the SS and a physical broadcast channel (PBCH).

Preferably, the pre-defined window is an SS measurement timing configuration (SMTC) or an SSB transmission window.

Preferably, in time domain, one window contains a number of candidate positions; the transmitting of the SSB in the window comprises: transmitting one SSB set in one window consecutively in time domain, wherein each SSB is transmitted on one corresponding candidate position.

Preferably, in time domain, one window contains a number of candidate-position sets, each candidate-position set comprising a number of candidate positions; the transmitting of the SSB in the window comprises: transmitting one SSB set in one of the candidate-position sets consecutively in time domain, wherein each SSB is transmitted on one corresponding candidate position in the candidate-position set.

Preferably, the transmitting of one SSB set in one of the candidate-position sets comprises: transmitting one SSB set in one of the candidate-position sets consecutively in time domain in order of an SSB index.

Preferably, the candidate-position sets contained in one window do not overlap with each other, each of the candidate-position sets except the last candidate-position set contains L candidate positions, and the number of candidate positions contained in the last candidate-position set is not greater than L, where L is the number of SSBs contained in one complete SSB set; the transmitting of one SSB set in one of the candidate-position sets comprises: transmitting one SSB set containing $L_d$ SSBs in one of the candidate-position sets consecutively in time domain, where $L_d \leq L$.

Preferably, the candidate-position sets contained in one window do not overlap with each other, each of the candidate-position sets except the last candidate-position set contains $L_e$ candidate positions, and the number of the candidate positions contained in the last candidate-position set is not greater than $L_e$, where $L_e$ is the number of the SSBs contained in one SSB set expected to be transmitted by a base station; the transmitting of one SSB set in one of the candidate-position sets comprises: transmitting one SSB set containing $L_d$ SBBs in one of the candidate-position sets consecutively in time domain, where $L_d \leq L_e$.

Preferably, the base station may indicate whether the one SSB candidate-position set in one SMTC or an SSB transmission window is determined according to $L_e$ or L, by system information or high-level signaling.

Preferably, the candidate-position sets contained in one window partially overlap with each other, and each candidate-position set contains L candidate positions, where L is the number of SSBs contained in one complete SSB set; the transmitting of one SSB set in one of the candidate-position sets comprises: transmitting one SSB set containing $L_d$ SSBs in one of the candidate-position sets consecutively in time domain, where $L_d \leq L$.

Preferably, the candidate-position sets contained in one window partially overlap with each other, and each candidate-position set contains $L_e$ candidate positions, where $L_e$ is the number of SSBs contained in one SSB set expected to be transmitted by the base station; the transmitting of one SSB set in one of the candidate-position sets comprises: transmitting one SSB set containing $L_d$ SSBs in one of the candidate-position sets consecutively in time domain, where $L_d \leq L_e$.

Preferably, in time domain, one window contains a number of candidate-position sets, each candidate-position set comprising a number of candidate positions; one SSB set contains a number of SSB subsets, one SSB subset comprising a number of SSBs; the transmitting of the SSB in the window comprises: transmitting one SSB subset in one of the candidate-position sets consecutively in time domain, wherein each SSB is transmitted on one corresponding candidate position in the candidate-position set; returning to the step of performing the LBT operation; if the LBT operation succeeds, continuing to transmit the next SSB subset, and looping until transmission of one SSB set is completed; if the LBT operation fails, stopping transmission of the SSB.

Preferably, in time domain, one window contains a number of candidate-position sets which do not overlap with each other, wherein each of the candidate-position sets except the last candidate-position set contains L candidate positions which respectively correspond to SSB indexes 0, 1, . . . , L−1 in sequence, the number of the candidate positions contained in the last candidate-position set is not greater than L, and the candidate positions in the last candidate-position set respectively correspond to SSB indexes 0, 1, . . . , in sequence, where L is the number of the SSBs contained in one complete SSB set; the transmitting of the SSB in the window comprises: transmitting one SSB set consecutively in time domain, starting from any one of the candidate positions in the SMTC, wherein on each of the candidate positions one SSB whose SSB index corresponds to the candidate position is transmitted.

Preferably, in time domain, one window contains a number of candidate-position sets which do not overlap with each other, wherein each of the candidate-position sets except the last candidate-position set contains $L_e$ candidate positions, logical indexes of which respectively correspond to SSB logical indexes SSB0_, SSB1_, . . . , $SSB_{Le-1\_}$, and the number of the candidate positions contained in the last candidate-position set is not greater than $L_e$, where $L_e$ is the number of SSBs contained in one SSB set expected to be transmitted by the base station; the transmitting of the SSB in the window comprises: transmitting one SSB set consecutively in time domain, starting from any one of the candidate positions in the window, wherein on each of the candidate positions one SSB whose SSB logical index corresponds to the logical index of the candidate position is transmitted.

Preferably, the base station may indicate, to the UE, whether the predefined SSB pattern is determined according to $L_e$ or L, by system information or high-level signaling.

Preferably, the PBCH or a demodulation reference signal (DMRS) of the PBCH carries at least one of: information for determining the index of the SSB, information for determining the index of a system frame where the SSB is, information for determining the index of a subframe where the SSB is, and information for determining the index of a slot where the SSB is.

Preferably, the step of, if the LBT operation succeeds, transmitting the SSB in the window comprises: if the LBT operation succeeds, transmitting the SSB and a corresponding channel state information-reference signal (CSI-RS) in the window, or transmitting the SSB and a corresponding remaining system information (RMSI) in the window; the CSI-RS can be used in at least one of: radio link quality measurement, radio link monitoring (RLM) and beam management; the RMSI carries at least one of: information for determining the SSB index, information for determining the index of a system frame where the SSB is, information for determining the index of a subframe where the SSB is, and information for determining the index of a slot where the SSB is.

Preferably, consecutively performing the LBT operation in a number of predefined windows, respectively; if the LBT operation succeeds, transmitting a number of SSBs in the windows, respectively, wherein the SSBs with a same index are transmitted in a same beam direction.

Preferably, the pre-defined window is an SS measurement timing configuration (SMTC) or an SSB transmission window.

Preferably, consecutively performing the LBT operation in a number of windows, respectively; if the LBT operation succeeds, transmitting a number of SSBs in the windows, respectively, wherein the SSBs whose SSB indexes differ by an integer multiple of $L_e$ are transmitted in a same beam direction.

In order to achieve the above objective, the present disclosure provides a method for receiving an SS, the method comprising the steps of: receiving an SSB in a pre-defined window, wherein the SSB comprises the SS, or the SSB comprises the SS and a physical broadcast channel (PBCH); performing channel measurement and/or cell detection based on the received SSB.

Preferably, the pre-defined window is an SS measurement timing configuration (SMTC) or an SSB transmission window.

Preferably, the receiving of the SSB in the window comprises: consecutively receiving a number of SSBs in a number of windows, respectively; the method further comprises: after receiving the SSBs in the windows, determining that the SSBs in different windows and with a same SSB index satisfy a quasi-colocation (QCL) relationship.

Preferably, the determining that the SSBs in different windows and with a same index satisfy a QCL relationship comprises: determining that two SSBs have a same SSB index according to time-domain positions of the two SSBs in different windows, and determining that the two SSBs satisfy the QCL relationship.

Preferably, the method further comprises: after receiving the SSBs in the windows, determining that the SSBs in different windows and with SSB indexes differing by an integer multiple of $L_e$ satisfy a quasi-colocation (QCL) relationship.

Preferably, the method further comprises: acquiring SSB resource indication information in the window by any one of a cell common physical downlink control channel (C-PDCCH), a Group-specific PDCCH, and scheduling of a PDCCH of a physical downlink shared channel (PDSCH); avoiding a position of the SSB resource according to the SSB resource indication information, to receive any downlink signal or downlink physical channel except the SSB in the window.

Preferably, the avoiding comprises: avoiding a number of SSB resources distributed consecutively in time domain in the window according to the SSB resource indication information, to receive any downlink signal or downlink physical channel except the SSB in the window.

Preferably, the avoiding comprises: avoiding any number of SSB resources in time domain in the window according to the SSB resource indication information, to receive any downlink signal or downlink physical channel except the SSB in the window.

Preferably, the method further comprises: while receiving the SSB in the window, determining the index of a slot or subframe where the SSB is, according to a predefined SSB pattern and a position of one SSB set in the predefined SSB pattern indicated by a base station; or determining the index of a slot or subframe where the SSB is, according to a predefined SSB pattern and a position of the SSB in the predefined SSB pattern indicated by a base station.

Preferably, a start point of the predefined SSB pattern is a start point of the former half or the latter half of a specific system frame (SF).

Preferably, the predefined SSB pattern is determined according to the number $L_e$ of SSBs expected to be transmitted by the base station and/or logical indexes of the SSBs expected to be transmitted by the base station.

Preferably, the predefined SSB pattern is determined according to the number L of SSBs contained in one complete SSB set and/or the SSB indexes of SSBs in the one SSB set.

Preferably, information about the SSBs expected to be transmitted by the base station is notified to the UE by system information or high-level signaling.

Preferably, the base station may indicate, to the UE, whether the predefined SSB pattern is determined according to $L_e$ or L, by system information or high-level signaling.

To achieve the above objective, the present disclosure provides a method for determining a physical random access channel (PRACH) occasion, the method comprising the steps of: determining a PRACH occasion corresponding to SSBs, according to the SSBs expected to be transmitted by a base station and PRACH configuration information; determining whether the PRACH occasion is valid, based on resources of the PRACH occasion, and all SSB candidate positions in a PRACH slot where the PRACH occasion is and/or in a slot preceding the PRACH slot.

Preferably, information about the SSBs expected to be transmitted by the base station may be notified to the UE by system information and/or high-level signaling.

In order to achieve the above objective, the present disclosure provides a base station equipment, which comprises: LBT operation module configured to perform an LBT operation in a pre-defined window; SSB transmission module configured to transmit an SSB in the window if the LBT operation succeeds, wherein the SSB comprises an SS, or the SSB comprises the SS and a PBCH.

In order to achieve the above objective, the present disclosure provides a user equipment, which comprises: receiving module configured to receive an SSB in a pre-defined window, wherein the SSB comprises an SS, or the SSB comprises the SS and a PBCH; measuring module configured to perform channel measurement and/or cell detection based on the received SSB.

Compared with the prior art, the technical effects of the present disclosure include, but are not limited to, significantly improving the efficiency of data transmission and improving the performance of cell measurement by relaxing the time when the base station implements the LBT, that is, allowing the base station to implement the LBT in a pre-defined window and transmit the SSB after the LBT succeeds.

DESCRIPTION OF DRAWINGS

In order to more clearly illustrate the technical solutions of the embodiments of the present disclosure, the drawings to be used in the description of the embodiments will be briefly introduced below. It is obvious that the drawings in the following description are only for some embodiments of the present disclosure. From the drawings, those skilled in the art can obtain other drawings without any creative work.

BEST MODE

Figure 1:
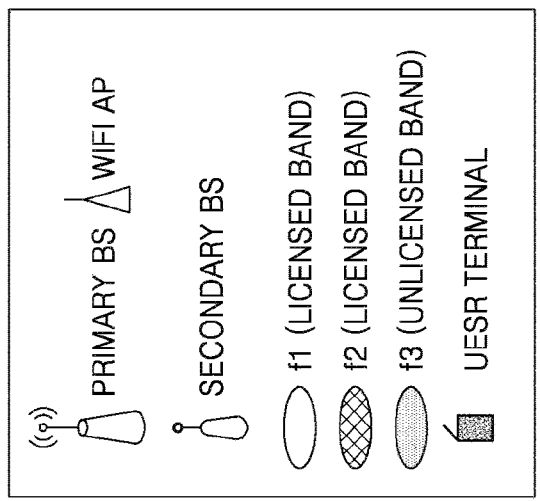
FIG. 1 is a schematic diagram of a 5G system operating at the unlicensed frequency bands in the background art.
Figure 1:
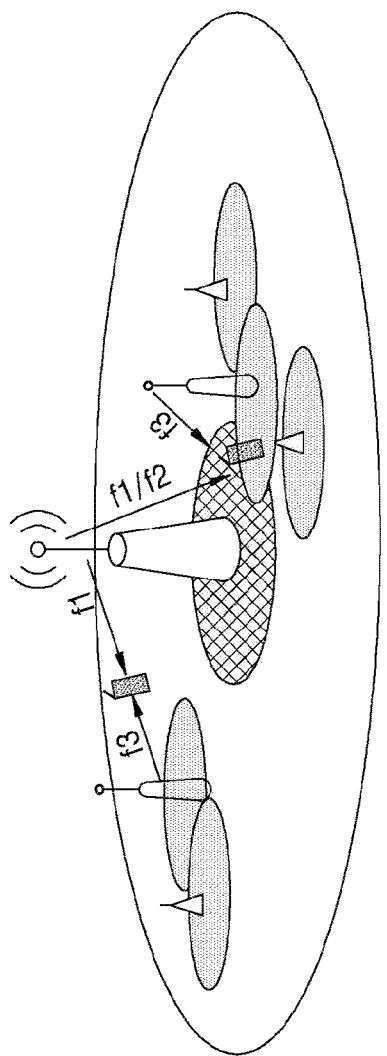

The present disclosure aims to overcome the defects of the prior art and provide a method and equipment for transmitting a synchronization signal with a desirable efficiency of data transmission.

In order to achieve the above objective, the present disclosure provide a method for transmitting a synchronization signal (SS), the method comprising the steps of: performing a listen-before-talk (LBT) operation in a pre-defined window; if the LBT operation succeeds, transmitting an SS block (SSB) in the window, wherein the SSB comprises the SS, or the SSB comprises the SS and a physical broadcast channel (PBCH).

Preferably, the pre-defined window is an SS measurement timing configuration (SMTC) or an SSB transmission window.

Preferably, in time domain, one window contains a number of candidate positions; the transmitting of the SSB in the window comprises: transmitting one SSB set in one window consecutively in time domain, wherein each SSB is transmitted on one corresponding candidate position.

Preferably, in time domain, one window contains a number of candidate-position sets, each candidate-position set comprising a number of candidate positions; the transmitting of the SSB in the window comprises: transmitting one SSB set in one of the candidate-position sets consecutively in time domain, wherein each SSB is transmitted on one corresponding candidate position in the candidate-position set.

Preferably, the transmitting of one SSB set in one of the candidate-position sets comprises: transmitting one SSB set in one of the candidate-position sets consecutively in time domain in order of an SSB index.

Preferably, the candidate-position sets contained in one window do not overlap with each other, each of the candidate-position sets except the last candidate-position set contains L candidate positions, and the number of candidate positions contained in the last candidate-position set is not greater than L, where L is the number of SSBs contained in one complete SSB set; the transmitting of one SSB set in one of the candidate-position sets comprises: transmitting one SSB set containing $L_d$ SSBs in one of the candidate-position sets consecutively in time domain, where $L_d \leq L$.

Preferably, the candidate-position sets contained in one window do not overlap with each other, each of the candidate-position sets except the last candidate-position set contains $L_e$ candidate positions, and the number of the candidate positions contained in the last candidate-position set is not greater than $L_e$, where $L_e$ is the number of the SSBs contained in one SSB set expected to be transmitted by a base station; the transmitting of one SSB set in one of the candidate-position sets comprises: transmitting one SSB set containing $L_d$ SBBs in one of the candidate-position sets consecutively in time domain, where $L_d \leq L_e$.

Preferably, the base station may indicate whether the one SSB candidate-position set in one SMTC or an SSB transmission window is determined according to $L_e$ or L, by system information or high-level signaling.

Preferably, the candidate-position sets contained in one window partially overlap with each other, and each candidate-position set contains L candidate positions, where L is the number of SSBs contained in one complete SSB set; the transmitting of one SSB set in one of the candidate-position sets comprises: transmitting one SSB set containing $L_d$ SSBs in one of the candidate-position sets consecutively in time domain, where $L_d \leq L$.

Preferably, the candidate-position sets contained in one window partially overlap with each other, and each candidate-position set contains $L_e$ candidate positions, where $L_e$ is the number of SSBs contained in one SSB set expected to be transmitted by the base station; the transmitting of one SSB set in one of the candidate-position sets comprises: transmitting one SSB set containing $L_d$ SSBs in one of the candidate-position sets consecutively in time domain, where $L_d \leq L_e$.

Preferably, in time domain, one window contains a number of candidate-position sets, each candidate-position set comprising a number of candidate positions; one SSB set contains a number of SSB subsets, one SSB subset comprising a number of SSBs; the transmitting of the SSB in the window comprises: transmitting one SSB subset in one of the candidate-position sets consecutively in time domain, wherein each SSB is transmitted on one corresponding candidate position in the candidate-position set; returning to the step of performing the LBT operation; if the LBT operation succeeds, continuing to transmit the next SSB subset, and looping until transmission of one SSB set is completed; if the LBT operation fails, stopping transmission of the SSB.

Preferably, in time domain, one window contains a number of candidate-position sets which do not overlap with each other, wherein each of the candidate-position sets except the last candidate-position set contains L candidate positions which respectively correspond to SSB indexes 0, 1, . . . , L−1 in sequence, the number of the candidate positions contained in the last candidate-position set is not greater than L, and the candidate positions in the last candidate-position set respectively correspond to SSB indexes 0, 1, . . . , in sequence, where L is the number of the SSBs contained in one complete SSB set; the transmitting of the SSB in the window comprises: transmitting one SSB set consecutively in time domain, starting from any one of the candidate positions in the SMTC, wherein on each of the candidate positions one SSB whose SSB index corresponds to the candidate position is transmitted.

Preferably, in time domain, one window contains a number of candidate-position sets which do not overlap with each other, wherein each of the candidate-position sets except the last candidate-position set contains $L_e$ candidate positions, logical indexes of which respectively correspond to SSB logical indexes $SSB0\_, SSB1\_, \ldots, SSB_{Le-1\_}$, and the number of the candidate positions contained in the last candidate-position set is not greater than $L_e$, where $L_e$ is the number of SSBs contained in one SSB set expected to be transmitted by the base station; the transmitting of the SSB in the window comprises: transmitting one SSB set consecutively in time domain, starting from any one of the candidate positions in the window, wherein on each of the candidate positions one SSB whose SSB logical index corresponds to the logical index of the candidate position is transmitted.

Preferably, the base station may indicate, to the UE, whether the predefined SSB pattern is determined according to $L_e$ or L, by system information or high-level signaling.

Preferably, the PBCH or a demodulation reference signal (DMRS) of the PBCH carries at least one of: information for determining the index of the SSB, information for determining the index of a system frame where the SSB is, information for determining the index of a subframe where the SSB is, and information for determining the index of a slot where the SSB is.

Preferably, the step of, if the LBT operation succeeds, transmitting the SSB in the window comprises: if the LBT operation succeeds, transmitting the SSB and a corresponding channel state information-reference signal (CSI-RS) in the window, or transmitting the SSB and a corresponding remaining system information (RMSI) in the window; the CSI-RS can be used in at least one of: radio link quality measurement, radio link monitoring (RLM) and beam management; the RMSI carries at least one of: information for determining the SSB index, information for determining the index of a system frame where the SSB is, information for determining the index of a subframe where the SSB is, and information for determining the index of a slot where the SSB is.

Preferably, consecutively performing the LBT operation in a number of predefined windows, respectively; if the LBT operation succeeds, transmitting a number of SSBs in the windows, respectively, wherein the SSBs with a same index are transmitted in a same beam direction.

Preferably, the pre-defined window is an SS measurement timing configuration (SMTC) or an SSB transmission window.

Preferably, consecutively performing the LBT operation in a number of windows, respectively; if the LBT operation succeeds, transmitting a number of SSBs in the windows, respectively, wherein the SSBs whose SSB indexes differ by an integer multiple of $L_e$ are transmitted in a same beam direction.

In order to achieve the above objective, the present disclosure provides a method for receiving an SS, the method comprising the steps of: receiving an SSB in a pre-defined window, wherein the SSB comprises the SS, or the SSB comprises the SS and a physical broadcast channel (PBCH); performing channel measurement and/or cell detection based on the received SSB.

Preferably, the pre-defined window is an SS measurement timing configuration (SMTC) or an SSB transmission window.

Preferably, the receiving of the SSB in the window comprises: consecutively receiving a number of SSBs in a number of windows, respectively; the method further comprises: after receiving the SSBs in the windows, determining that the SSBs in different windows and with a same SSB index satisfy a quasi-colocation (QCL) relationship.

Preferably, the determining that the SSBs in different windows and with a same index satisfy a QCL relationship comprises: determining that two SSBs have a same SSB index according to time-domain positions of the two SSBs in different windows, and determining that the two SSBs satisfy the QCL relationship.

Preferably, the method further comprises: after receiving the SSBs in the windows, determining that the SSBs in different windows and with SSB indexes differing by an integer multiple of $L_e$ satisfy a quasi-colocation (QCL) relationship.

Preferably, the method further comprises: acquiring SSB resource indication information in the window by any one of a cell common physical downlink control channel (C-PDCCH), a Group-specific PDCCH, and scheduling of a PDCCH of a physical downlink shared channel (PDSCH); avoiding a position of the SSB resource according to the SSB resource indication information, to receive any downlink signal or downlink physical channel except the SSB in the window.

Preferably, the avoiding comprises: avoiding a number of SSB resources distributed consecutively in time domain in the window according to the SSB resource indication information, to receive any downlink signal or downlink physical channel except the SSB in the window.

Preferably, the avoiding comprises: avoiding any number of SSB resources in time domain in the window according to the SSB resource indication information, to receive any downlink signal or downlink physical channel except the SSB in the window.

Preferably, the method further comprises: while receiving the SSB in the window,
determining the index of a slot or subframe where the SSB is, according to a predefined SSB pattern and a position of one SSB set in the predefined SSB pattern indicated by a base station; or determining the index of a slot or subframe where the SSB is, according to a predefined SSB pattern and a position of the SSB in the predefined SSB pattern indicated by a base station.

Preferably, a start point of the predefined SSB pattern is a start point of the former half or the latter half of a specific system frame (SF).

Preferably, the predefined SSB pattern is determined according to the number $L_e$ of SSBs expected to be transmitted by the base station and/or logical indexes of the SSBs expected to be transmitted by the base station.

Preferably, the predefined SSB pattern is determined according to the number L of SSBs contained in one complete SSB set and/or the SSB indexes of SSBs in the one SSB set.

Preferably, information about the SSBs expected to be transmitted by the base station is notified to the UE by system information or high-level signaling.

Preferably, the base station may indicate, to the UE, whether the predefined SSB pattern is determined according to $L_e$ or L, by system information or high-level signaling.

To achieve the above objective, the present disclosure provides a method for determining a physical random access channel (PRACH) occasion, the method comprising the steps of: determining a PRACH occasion corresponding to SSBs, according to the SSBs expected to be transmitted by a base station and PRACH configuration information; determining whether the PRACH occasion is valid, based on resources of the PRACH occasion, and all SSB candidate positions in a PRACH slot where the PRACH occasion is and/or in a slot preceding the PRACH slot.

Preferably, information about the SSBs expected to be transmitted by the base station may be notified to the UE by system information and/or high-level signaling.

In order to achieve the above objective, the present disclosure provides a base station equipment, which comprises: LBT operation module configured to perform an LBT operation in a pre-defined window; SSB transmission module configured to transmit an SSB in the window if the LBT operation succeeds, wherein the SSB comprises an SS, or the SSB comprises the SS and a PBCH.

In order to achieve the above objective, the present disclosure provides a user equipment, which comprises: receiving module configured to receive an SSB in a pre-defined window, wherein the SSB comprises an SS, or the SSB comprises the SS and a PBCH; measuring module configured to perform channel measurement and/or cell detection based on the received SSB.

Compared with the prior art, the technical effects of the present disclosure include, but are not limited to, significantly improving the efficiency of data transmission and improving the performance of cell measurement by relaxing the time when the base station implements the LBT, that is, allowing the base station to implement the LBT in a predefined window and transmit the SSB after the LBT succeeds.

MODE FOR INVENTION

Embodiments of the present disclosure will be described in detail hereafter. The examples of these embodiments have been illustrated in the drawings throughout which same or similar reference numerals refer to same or similar elements or elements having same or similar functions. The embodiments described hereafter with reference to the drawings are illustrative, merely used for explaining the present disclosure and should not be regarded as any limitations thereto.

It should be understood by those skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It should be understood that when a component is referred to as being "connected to" or "coupled to" another component, it may be directly connected or coupled to other elements or provided with intervening elements therebetween. In addition, "connected to" or "coupled to" as used herein may include wireless connection or coupling. As used herein, term "and/or" includes all or any of one or more associated listed items or combinations thereof.

Unless otherwise defined, all terms (including technical and scientific terms) used herein have the same meaning as commonly understood by those skill in the art to which the present disclosure belongs. It shall be further understood that terms, such as those defined in commonly used dictionaries, should be interpreted as having a meaning that is consistent with their meanings in the context of the prior art and will not be interpreted in an idealized or overly formal sense unless expressly so defined herein.

In order to meet a demand for huge traffic, the 5G communication system is expected to operate at various frequency bands from the low frequency band up to the high frequency band of about 100 GHz, including licensed and unlicensed frequency bands. As for the unlicensed frequency bands, the frequency band of 5 GHz and the frequency band of 60 GHz are mainly considered. The 5G system operating at the unlicensed frequency bands is referred to as the NR-U system, which may involve a scenario of operating independently at the unlicensed frequency bands and a scenario of operating in a dual connectivity (DC) mode with the licensed frequency bands, and may also involve a scenario of operating in a carrier aggregation (CA) mode with the licensed frequency bands, as shown in FIG. 1. In the frequency band of 5 GHz, the Wireless Fidelity (WiFi) system, the radar system and the LTE's licensed assisted access (LAA) system of the 802.11 series have been deployed and each complies with the listen before talk (LBT) mechanism, that is, a wireless channel must be detected before a signal is transmitted thereon, and the wireless channel may be occupied to transmit the signal only if it is detected that the wireless channel is idle. In general, the LBT in this frequency band is omnidirectional. In order to coexist with these existing systems, the NR-U system must be also based on a similar LBT mechanism. In the frequency band of 60 GHz, there are a small number of 802.11ay systems deployed. In order to implement the coexistence, it is also necessary to perform the corresponding LBT. Moreover, in the frequency band of 60 GHz, the beamforming is often adopted to obtain a gain in order to compensate for extremely high path loss. Use of directional transmission on the unlicensed frequency bands may reduce interference between the transmitting nodes in different directions more effectively, with the unique problem of directionality introduced.

At present, in regard of the LBT mechanism based on a synchronization signal (SS) and a control channel of the unlicensed frequency, the base station (BS) configures an SS measurement timing configuration (SMTC) for the UE, so that the UE may attempt to detect in each SMTC an SS (for example, a primary SS (PSS) and a secondary SS (SSS)) or a physical broadcast channel (PBCH). Before transmitting the SS or the PBCH in the SMTC, the base station must perform the LBT, that is, transmitting the SS or the PBCH only upon determining that there is an idle channel available. If the LBT fails, the SS or the PBCH cannot be transmitted, which may result in a reduced transmission density of the SS or the PBCH and affect the efficiency of transmission and the performance of cell measurement.

The base station transmits one SS in each DRS (Discovery Reference Signal) measurement timing configuration (DMTC) by using the same transmitting power and the same transmitting antenna. Therefore, the UE may combine the SS detected in each DMTC to improve the measurement performance. However, in the 5G communication system, the base station may attempt to transmit one set of SSs in each SMTC, and the base station may employ different transmitting antennas or beams to transmit a plurality of SSs included in the one set. How the base station transmits these SSs may directly affect the probability of transmitting the SSs, thereby affecting the efficiency of transmitting the SSs and the performance of the cell measurement, and may also affect the assumption for the UE to combine the SSs detected in respective SMTCs. In addition, due to the uncertainty of transmission of the SSs by the base station, the UE cannot determine on which time-frequency resources a Physical Downlink Shared Channel (PDSCH) transmitted with the SSs is to be received.

In the prior art, the SS in the DMTC detected by the UE is only used for radio resource measurement (RRM), and it is unnecessary to determine time information, such as a subframe index, according to the SS. However, in the 5G communication system, for a scenario of networking independently at the unlicensed frequency bands, the UE must determine time information of the cell according to the detected SS and/or PBCH in the initial access process. In the licensed frequency bands, since the positions of the SSs are in definite one-to-one correspondence with the slot indexes, the UE may determine the time information of the cell by detecting the SS. However, in the unlicensed frequency bands, the position of the SS is variable, so the method in the prior art cannot support the UE to obtain the time information of the cell.

In view of the above, it is necessary to provide a method and device for transmitting/receiving a synchronization signal, which can solve the above technical problems.

It should be understood by a person of ordinary skill in the art that terms "terminal" and "user equipment" as used herein cover not only apparatus with only a wireless signal receiver having no capability of transmission but also apparatus with receiving and transmitting hardware capable of carrying out bidirectional communication over a bidirectional communication link. Such apparatuses may include:

cellular or other communication apparatuses with a single-line or multi-line display or without a multi-line display; a Personal Communication Service (PCS) with combined capabilities of speech, data processing, facsimile and/or data communication; a Personal Digital Assistant (PDA), which may include a RF receiver, a pager, an internet/intranet access, a web browser, a notepad, a calendar and/or a Global Positioning System (GPS) receiver; and/or a conventional laptop and/or palmtop computer or other apparatus having and/or including a RF receiver. The "terminal" or "terminal apparatus" as used herein may be portable, transportable and mountable in transportations (by air, sea and/or land), or may be adapted and/or configured to operate locally and/or at any other place of the earth and/or space in a distributed mode. The "terminal" or "terminal apparatus" as used herein may be a communication terminal, a network terminal, or a music/video play terminal. For example, it may be a PDA, a Mobile Internet Device (MID) and/or a mobile phone with a music/video play function, or may be apparatus such as a smart TV, a set-top box or the like.

First, the LBT mechanism of the prior art, in which the base station transmits the synchronization signal (SS) and the control channel and the UE receives the SS and the control channel, will be briefly introduced.

For example, in a scenario, when the UE is in a radio resource configuration (RRC) connection state or in an RRC idle state and is served by a base station 1, the base station 1 may configure this UE to measure one or more cells, for example, performing RRM measurement. Usually, the base station 1 configures an SS measurement timing configuration (SMTC) for the UE, and the UE may attempt to detect in each SMTC an SS (for example, a primary SS (PSS) and a secondary SS (SSS)) or a physical broadcast channel (PBCH). The UE in the RRC connection state may determine the SMTC according to the RRC signaling of the base station, while the UE in the RRC idle state may determine the SMTC according to the acquired SMTC information or determine information about a period of an SS block (SSB) etc. according to system information. The UE in the RRC connection state may also attempt to detect one or more SSs in one SMTC according to a configuration of a base station. The UE may perform measurement according to the SS detected in one SMTC, or the UE may combine measurement results of the SSs detected in multiple SMTCs and satisfying a predefined relation. If the measurement is performed only according to the SS detected in one SMTC, and the measurement configured for the UE by the base station has no need of distinguishing beams and only requires the UE to perform measurement and report based on the cell as a minimum granularity, the UE does not need to distinguish the directionality of the measured SS. If it is necessary to combine measurement results of multiple SSs or the base station configures for the UE a measurement with a beam as a granularity, which may be embodied as the need for reporting the SS index when performing the measurement or reporting the measurement results, it is necessary to design a method to enable the UE to recognize the index of the received SS, which is also referred as to the SSB index. One SSB may contain one SS and a PBCH, or may contain only one SS. The base station may transmit one SSB set which may contain at most L SSBs, wherein each SSB is numbered as 1, which may be 0~L−1, in a chronological order. Generally, SSs with a same SSB index are regarded as having similar channel characteristics and as Quasi-colocation (QCL), and may be combined. Generally, QCL refers to spatial QCL characteristics, which may be classified into various types, for example, both the Doppler characteristics and the channel delay characteristics satisfying the QCL, or only the Doppler characteristics satisfying the QCL, or only the spatial reception parameters satisfying the QCL, or other situation, or a combination of various situations. The present disclosure does not define the type of QCL characteristics.

As another example, in a scenario, the UE is in an initial access state and may attempt to receive the SS by blind detection or also attempt to detect the PBCH. Compared with the previous scenario, the UE needs further to obtain time information of the cell to which the detected SSB belongs, and prepare for subsequent system information reception or resources for the random access procedure. The time information includes a boundary of a symbol, a boundary of a slot/subframe, and a system frame (SF) index.

Generally, in a carrier of the licensed frequency band, the base station may periodically transmit the SSB at a fixed position. For example, one SSB set is transmitted at a fixed position in each SMTC, so the UE may also find this fixed position in the SMTC through auxiliary information of the base station, and assume that it does not change for a long time or until new auxiliary information is received. One SSB set may contain one SSB or contain multiple SSBs. For example, in a system supporting beam-based transmission, a base station may transmit one SSB set containing $L_d$ SSBs, where $L_d \le L$, each SSB may correspond to a different beam direction, or multiple SSBs correspond to a same direction, or $L_d$ SSBs may correspond to different directions.

Figure 2:
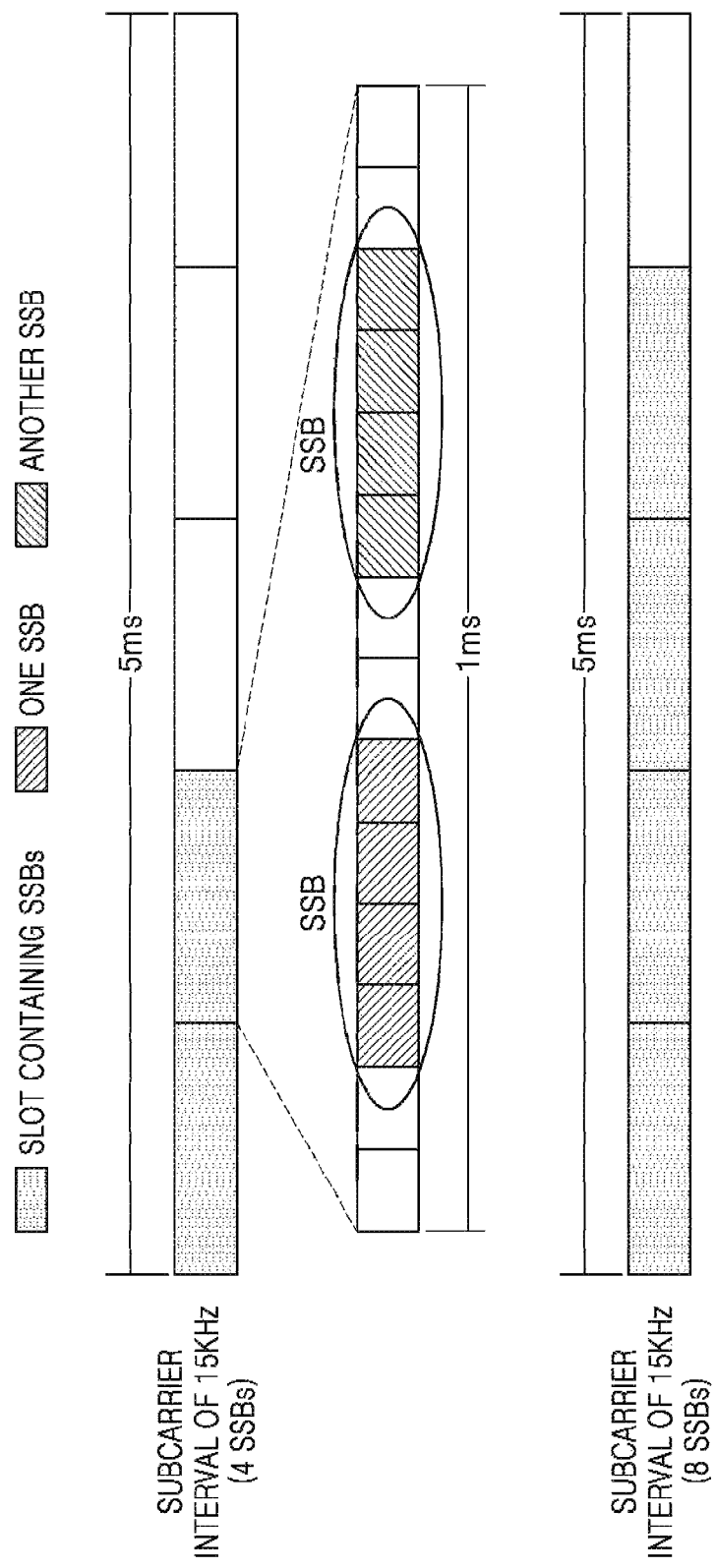
FIG. 2 is a schematic diagram of a first SSB transmission arrangement according to the present disclosure.
Figure 3:
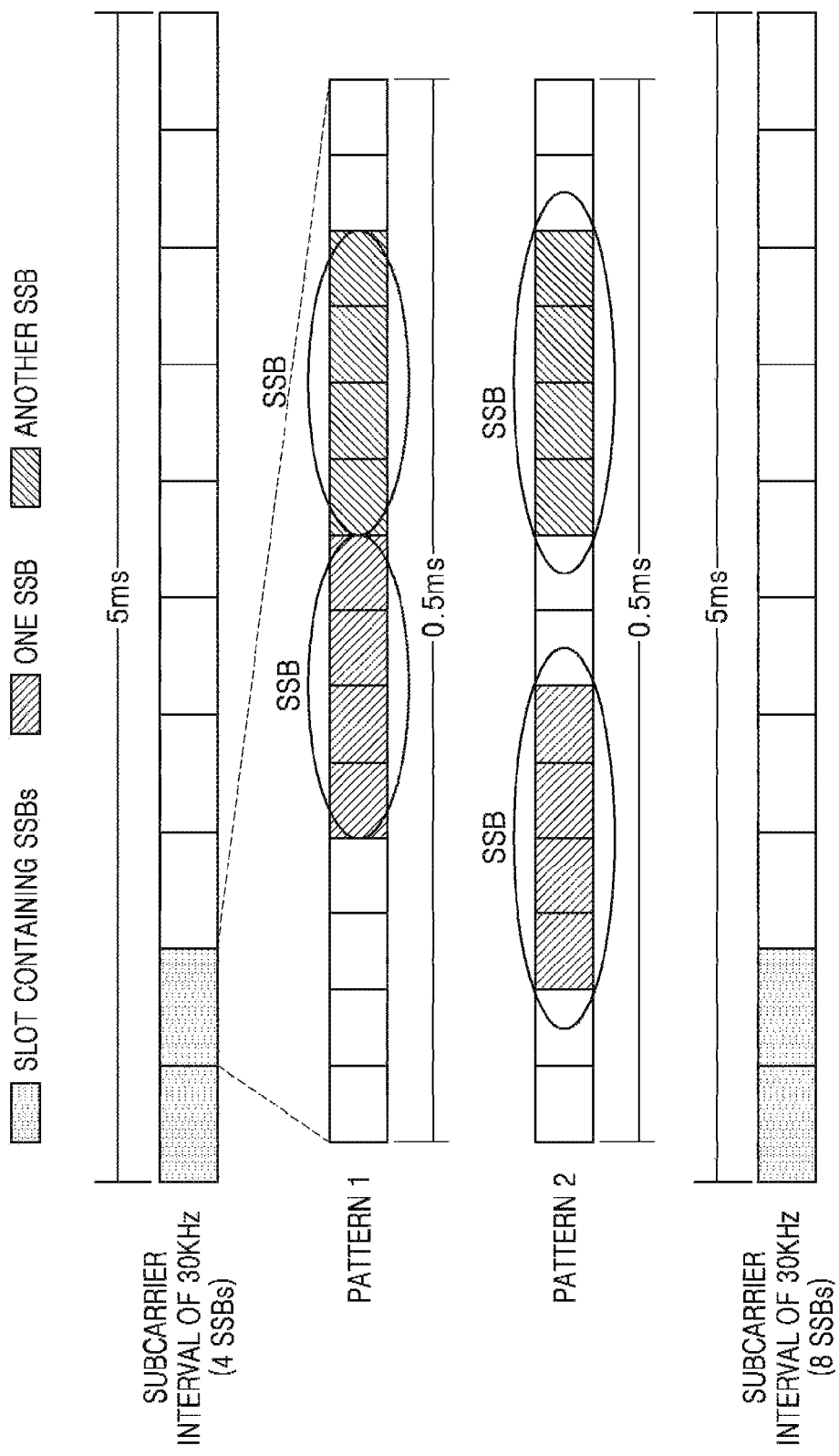
FIG. 3 is a schematic diagram of a second SSB transmission arrangement according to the present disclosure.
Figure 4:
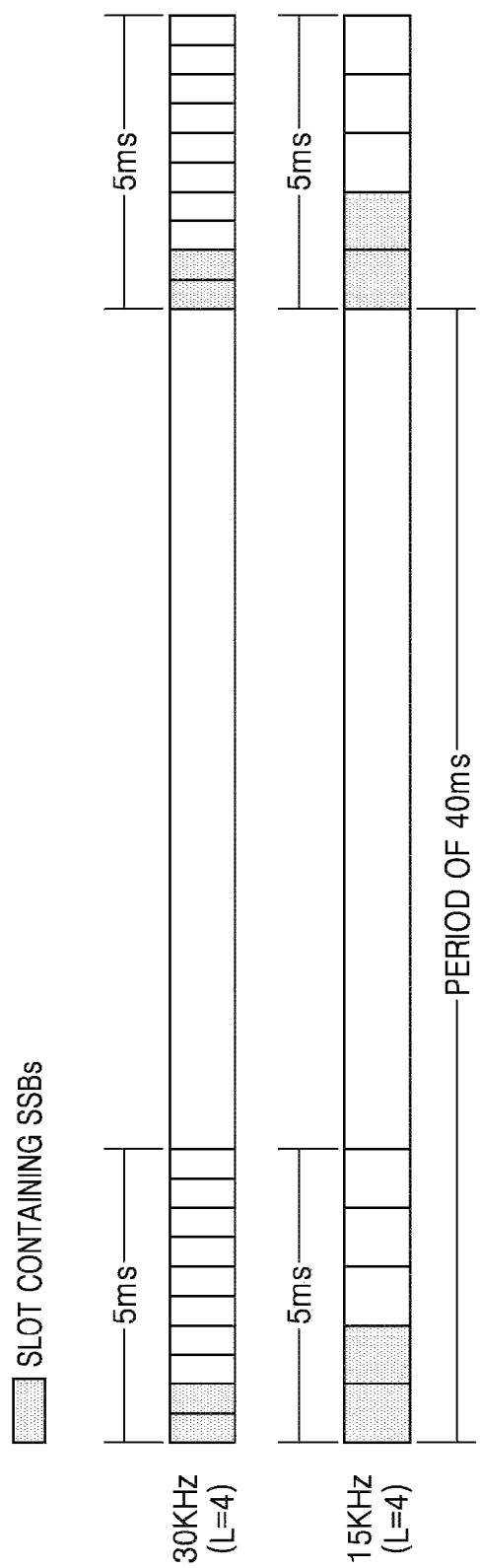
FIG. 4 is a schematic diagram of a third SSB transmission arrangement according to the present disclosure.

As shown in FIG. 2, when a subcarrier interval is 15 KHz, one SSB set may contain at most L SSBs, where L=4 or L=8. This SSB set is always in a window of 5 ms of the former half or the latter half of a system frame (SF) with a length of 10 ms. As shown in FIG. 3, when the subcarrier interval is 30 KHz, one SSB set may contain at most L SSBs, where L=4 or L=8, and may have two possible patterns, from which the base station will select one pattern according to the system deployment. When the subcarrier interval is 120 KHz or 240 KHz, one SSB set may contain at most L SSBs, where L=64. Each SSB is numbered from 0 to L−1 in a chronological order. Though the number of SSBs contained in one SSB set actually transmitted by the base station may be less than L, the SSB index is determined uniquely by the time position. The base station will periodically transmit this SSB set. For example, the period may be 5 ms, 10 ms, 20 ms, 40 ms, or 80~180 ms. FIG. 4 provides an example in which the period is 40 ms.

Figure 5:
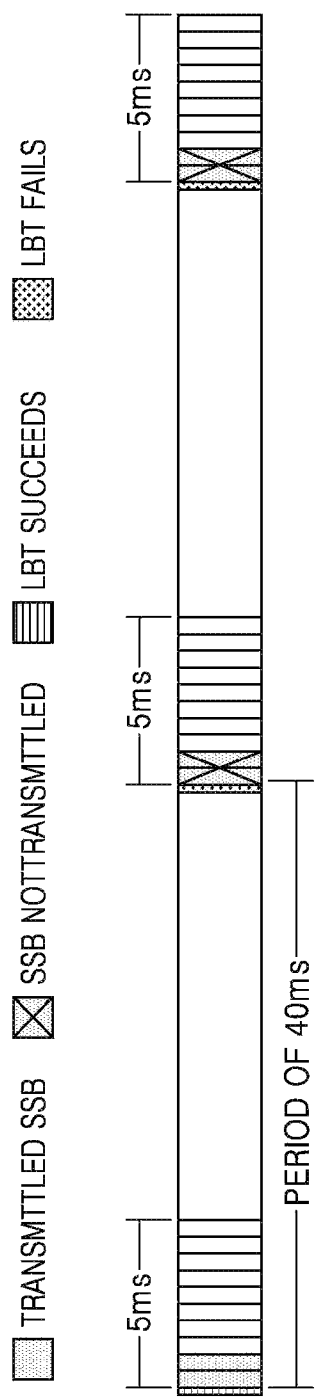
FIG. 5 is a schematic diagram of a fourth SSB transmission arrangement according to the present disclosure.

When the base station configures the SMTC for the UE, the period of the SMTC is not limited to be the same as that of the SSBs. For example, the period of the SMTC may be longer if the requirement for measurement performance could be met. In addition, in configuring the SMTC, it is necessary to ensure that the SMTC window at least partially overlaps with the SSB transmission window, so that the UE may detect the SSBs in the SMTC window. In one implementation, the two may be considered as being identical. In another implementation, the SMTC window overlaps only partially with the SSB transmission window, without the limitation that the start points of all the SSBs to be measured by the UE are at the starting position of the SMTC. For example, the base station may configure that the UE needs to measure for cell A the SSBs respectively with the SSB indexes l=3 and =4, and the two SSBs may be at the first slot in the SMTC, or the base station may configure that the two SSBs are at the other slot in the SMTC if it is ensured that the two SSBs may be completely contained in the SMTC. In each SMTC, the positions of the two SSBs remain unchanged. If it is necessary to transmit a signal based on LBT in the case where SSBs are on carriers of the unlicensed frequency bands, or if it is necessary to transmit a signal based on LBT for reducing interference even in the case where SSBs are on carriers of the licensed frequency bands, it is uncertain whether there are SSBs in each SMTC or not. In this case, the UE can only assume that there is one SSB set from a certain cell or there is no SSB in each SMTC. As shown in FIG. 5, it is assumed that the one SSB set transmitted from cell A contains L=4 SSBs starting from the first slot in the SMTC, each of the period of the SMTC and the period of the SSBs is 40 ms. In the first SMTC, the base station of cell A has completed the LBT successfully, then the base station of cell A transmits one SSB set in a first slot and a second slot. In the second SMTC after 40 ms, the base station of cell A has not completed the LBT before the start of the SSBs in the first slot, then the transmission is not performed. In the third SMTC after 40 ms, the base station of cell A has not completed the LBT again before the start of the SSBs in the first slot, then the transmission is not performed again. Accordingly, the UE may detect one SSB set only in the first SMTC, and may not detect the SSBs in the second and third SMTCs. It can be seen that the LBT may result in reduction in the transmission density of the SSBs, which will affect inevitably the performance of cell measurement. Similarly, when the user performs the initial access, if it is necessary to perform the LBT before the base station transmits the SSBs, the UE may not detect the SSBs for a long time since the base station fails to successfully complete the LBT and does not transmit the SSBs, so that the cell detection process of the UE may have a too long delay. In the case where the UE needs to combine multiple SSBs, after detecting one SSB, the UE may not detect another SSB available for combination for a long time, which will also affect the performance of cell measurement.

For solving this problem, the LBT faster than that for data transmission may be employed. For example, a first category of LBT (Cat-4 LBT) needs to be performed before normal data transmission, and generally several to thousands of idle carrier detection slots (CCA slots) are needed for transmitting data. Instead, a faster LBT may be employed for SSBs, for example, only one LBT of 25 µs, which is the same as the LBT for the DRS (Discovery Reference Signal) of the LTE's LAA system; alternatively, the first category of LBT with a highest priority, i.e. the first category of LBT with LBT priority=1, may be employed to reduce the required number of idle slots.

However, even with the faster LBT, the probability that the base station cannot transmit the SSBs is not negligible. The SSB may be transmitted at a larger density, for example, at a period of 5 ms, and a fast LBT may be employed. However, since data cannot be transmitted in the fast LBT used to transmit the SSBs, a too small period will cause the base station to always perform the fast LBT to attempt to transmit the SSBs, thereby losing the opportunity to transmit data. For example, when L=8 in FIG. 2, one SSB set occupies 4 ms. The base station may attempt to transmit the SSBs once every 5 ms. Only the last 1 ms may be left for the base station to attempt to use the normal LBT to occupy the channel for transmitting data. Such efficiency is very low.

In order to solve the above technical problem, the present disclosure provides an LBT scheme for transmitting/receiving an SS and a control channel.

Figure 6:
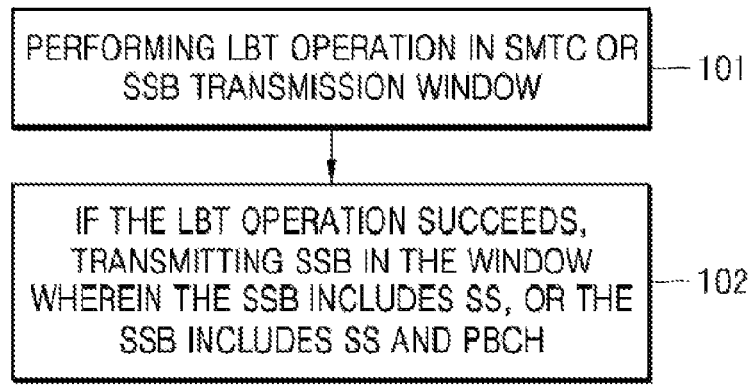
FIG. 6 is a flowchart of a method for transmitting a synchronization signal according to the present disclosure.

Referring to FIG. 6, a method for transmitting an SS according to the present disclosure comprises the following steps:

Step 101: Performing an LBT operation in an SMTC or an SSB transmission window;

Step 102: If the LBT operation succeeds, transmitting an SSB in the SMTC or in the SSB transmission window, wherein the SSB includes the SS, or the SSB includes the SS and a PBCH.

Figure 7:
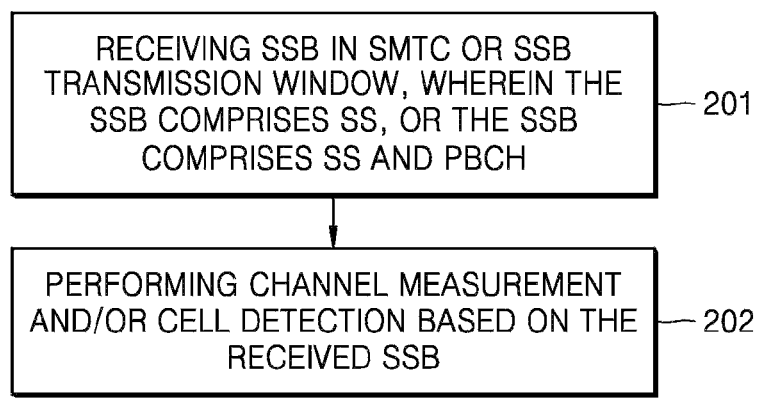
FIG. 7 is a flowchart of a method for receiving a synchronization signal according to the present disclosure.

Referring to FIG. 7, a method for receiving an SS according to the present disclosure comprises the following steps:

Step 201: receiving an SSB in an SMTC or an SSB transmission window, wherein the SSB comprises the SS, or the SSB comprises the SS and a PBCH;

For a UE that does not obtain SMTC information, for example, a UE that has just started up and has not yet established an RRC connection, it can only blindly detect the SSB, and/or receive the SSB in an SSB transmission window based on the received system information.

Step 202: Performing channel measurement and/or cell detection based on the received SSB. The channel measurement may include at least one of RRM measurement, RLM measurement, and beam measurement. The cell detection may include at least one of cell ID detection, cell virtual ID detection for SS sequence generation, and cell time information detection.

The base station may configure the start point of the SMTC as a start point of one SF or a start point of the latter half of one SF, that is, the start point of the SMTC may correspond to an integer multiple of 5 ms. Alternatively, the base station may configure the start point of the SMTC as the start point of any 1 ms in one SF. The SSB transmission window may be defined so that the start point thereof is the start point of one SF or the start point of the latter half of one SF. For convenience of description, it is assumed in the following examples that the SMTC window is identical to the SSB transmission window, unless otherwise specified. However, the method of the present disclosure is applicable to the case where the two windows partially overlap with each other and the case where the start point of the SMTC window is the start point of any 1 ms.

Compared with the prior art described above, the scheme of the present disclosure can increase the probability that the base station transmits the SSB, and may have no definition of the position of the SSB in each SMTC, that is, the relative position of the SSB in the SMTC may shift in the time dimension, thereby relaxing the requirement for the time when the LBT is performed. Candidate positions where the SSB may be transmitted in one SMTC window may be determined according to a predefined rule. The base station may perform the LBT before each candidate position (Alternatively, the LBT may be performed from an earlier time point, which is not defined in the present disclosure), and if the LBT succeeds, the base station may start to transmit one SSB set.

Upon detecting one SSB, the UE may determine the SSB index by detecting the Demodulation Reference Signal (DMRS) sequence of the PBCH in the SSB. Since the position of the SSB index is fixed, the UE may determine the boundary of the slot/subframe and the index of the slot/subframe in half of the SF according to the SSB index. Further, according to the PBCH in the SSB, the UE may also determine whether the SSB is in the former half of the SF or in the latter half of the SF, and the index of the SF.

If the position of the SSB may shift in the time dimension, the existing mechanism cannot support the UE to determine the SSB index and the time information from the detected SSB. Therefore, the present disclosure provides a method for enabling the UE to obtain the time information through the SSB or other signals. The specific implementation process of the scheme of the present disclosure will be specifically described below.

In step 301, the UE receives the SS.

In step 301, when the UE receives the SS, it may be assumed: the base station determines candidate positions where an SSB may be transmitted in one SMTC window according to a predefined rule; the base station may perform the LBT before each candidate position (Alternatively, the LBT may be performed from an earlier time point, which is not defined in the present disclosure); and if the LBT succeeds, the base station may start to transmit one SSB set.

The predefined rule may be at least one of the following rules:

(1) The whole SMTC is divided into a number of intervals, that is, a number of non-overlapping candidate-position sets. Each candidate-position set contains L candidate positions, where L is the number of SSBs in one complete SSB set. For one SMTC, after the LBT succeeds, the base station may select one of the candidate-position sets to transmit one SSB set.

All candidate positions in the SMTC window or in the SSB transmission window are determined at an interval of a time unit required for one SSB set.

Each candidate-position set may correspond to one complete SSB set consisting of L SSBs, and the L SSBs respectively correspond to SSB indexes 0~L−1. The positions of this SSB set in the candidate-position set are fixed. One SSB set actually transmitted by the base station may contain $L_d$ SSBs, where $L_d \leq L$.

In one SMTC window or the SSB transmission window, the base station may attempt to transmit one SSB set on multiple candidate-position sets. The base station may perform the LBT before each candidate-position set. If the LBT succeeds before a certain candidate-position set, the base station may transmit one SSB set on this candidate-position set, and may not transmit SSBs on the other candidate-position sets. In another implementation, one SSB set is divided into $L_{LBT}$ subsets, the LBT is necessary for each subset, and the SSBs in the same subset may be continuously transmitted. The base station may continuously transmit one SSB subset, starting from one candidate-position set. After the subset is transmitted, the base station may attempt to perform the LBT. If the LBT succeeds, the base station may continue to transmit the next subset of the SSBs in the same set, and thus loops until one SSB set is transmitted. The LBT before the first subset in one SSB set may be different from the LBTs before the other subsets in this set. For example, the LBT before the first subset is a more conservative LBT, for example, with a longer slot of the CCA or a larger direction angle of the CCA; and the following LBTs may be faster, for example, an LBT of 25 μs or with a direction of the CCA containing only the direction of this subset. If all the LBTs fail, the base station does not transmit the SSBs in one SMTC window or the SSB transmission window.

Figure 8A:
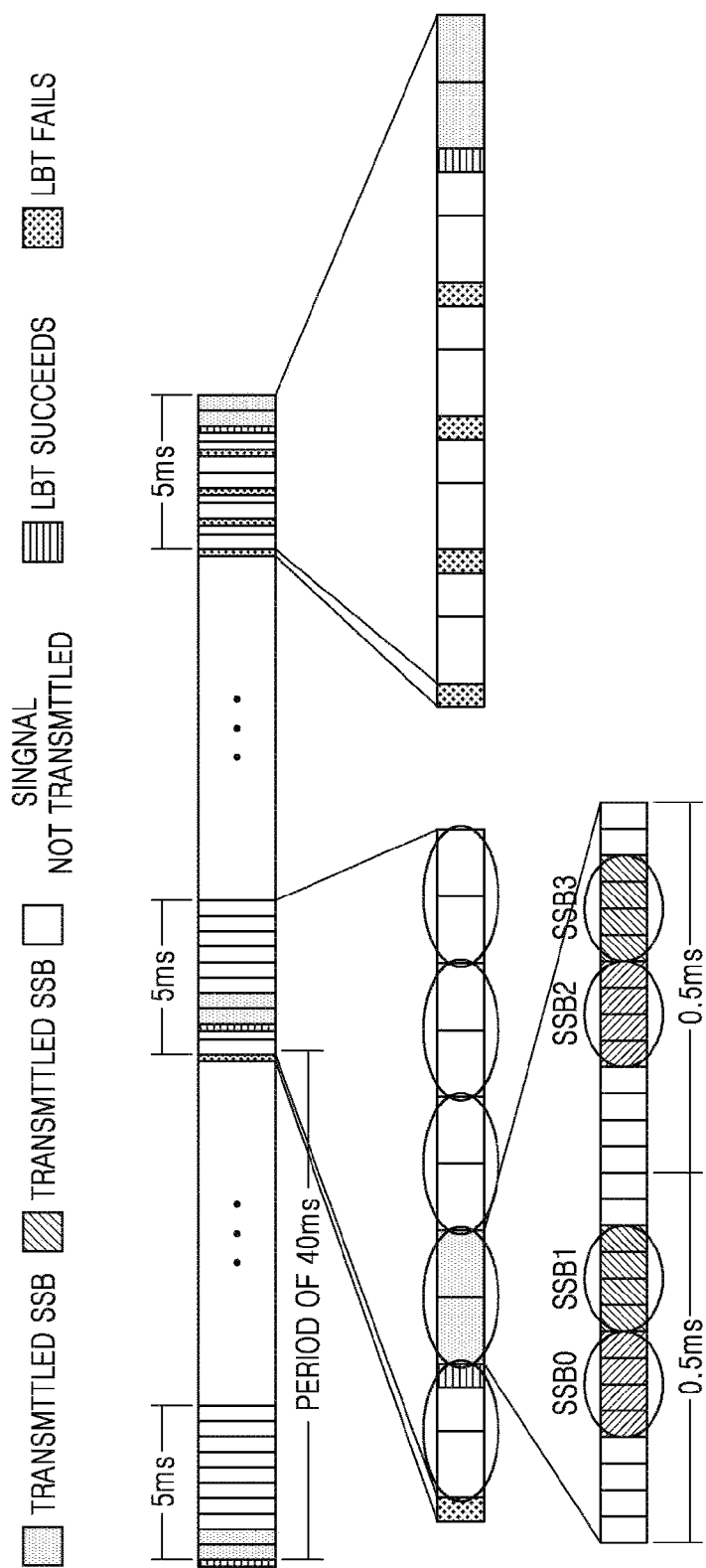
FIG. 8a is a schematic diagram of a fifth SSB transmission arrangement according to the present disclosure.

As shown in FIG. 8a, a subcarrier interval of 30 KHz and L=4 are taken for example. One SSB set occupies 2 slots, and the total length-of-time is 1 ms. Thus, in the SMTC window with a duration of 5 ms, there are five candidate-position sets, i.e. slots 0, 1, 2, 3 and 4. If the base station successfully completes the LBT before any of the candidate-position sets, the base station may transmit the SSB set on the corresponding candidate-position set. In FIG. 8a, in the second SMTC window, the base station does not complete the LBT before the first slot assumed as slot 0, but completes the LBT before the second slot (i.e. slot 1). Thus, the base station may transmit one SSB set in slot 1, wherein the number of SSBs expected to be transmitted by the base station is assumed as $L_e$=L. The base station does not need to transmit the SSBs on the other candidate positions in this SMTC. In the third SMTC, the base station does not complete the LBT until the start of slot 4, and then base station may transmit one SSB set in slot 4.

In this case, the UE may assume that in each SMTC there may be at most one SSB set on one candidate-position set or there is no SSB set.

In this method, a candidate-position set for one SSB set may be determined further based on whether a complete SSB set may be mapped. For example, if a candidate-position set is to be determined in a window of 5 ms, and each candidate-position set has a length-of-time of 2 ms, only two candidate-position sets will be available since the remaining length-of-time of only 1 ms is insufficient to map one complete SSB set. Therefore, for each candidate-position set with a length sufficient to transmit one SSB set, the number $L_d$ of SSBs contained in one SSB set actually transmitted by the base station remains unchanged and is equal to the number $L_e$ of SSBs contained in one SSB set expected to be transmitted by the base station. The base station may notify the UE of information about $L_e$ by the system information or higher-level signaling, for example, indicating by the PBCH which of the L SSBs to be transmitted, or indicating $L_e$ by the PBCH and assuming $L_e$ SSBs to be transmitted by the base station are numbered from 0 to $L_e$−1, or indicating, by the remaining system information (RMSI) which is also referred as to SIB1, which of the L SSBs are to be transmitted. Alternatively, a candidate-position set for one SSB set may be determined as only positions that map a part of the one SSB set. For example, if a candidate-position set is to be determined in a window of 5 ms, and each candidate-position set has a length-of-time of 2 ms, there will be two complete candidate-position sets, and the third candidate-position set has a length-of-time of only 1 ms and may map the former half of one SSB set. For the two complete candidate-position sets, the number $L_d$ of SSBs contained in one SSB set actually transmitted by the base station may be different from the number $L_d$ of SSBs actually transmitted on the third candidate-position set, and $L_d \leq L_e$.

The UE may assume that, in a long time, if respective one SSB set is transmitted in each SMTC window, the respective one SSB set in each SMTC window consists of SSBs with the same indexes. For example, if L=4, $L_e$=2, and SSB2 and SSB3 are expected to be transmitted by the base station, the respective one SSB set transmitted in each SMTC window consists of SSB2 and SSB3 if the base station successfully completes the LBT. If the length of the last candidate-position set in one SMTC window is not sufficient to contain L SSBs, the respective one SSB set in each SMTC window may consist of SSBs with the slightly different indexes.

When $L_e \leq L$, if the indexes of the SSBs expected to be transmitted by the base station are continuous (for example, L=4, $L_e$=2, and the indexes of the SSBs are 2 and 3), the base station may attempt to transmit SSB2 and SSB3 on the candidate positions therefor.

If the indexes of the SSBs expected to be transmitted by the base station are discontinuous (for example, L=4, $L_e$=2, and the indexes of the SSBs are 1 and 3), the base station may attempt to transmit SSB1 and SSB3 on the candidate positions therefor. In another implementation, the base station may attempt to sequentially transmit SSB1 and SSB3 on the candidate positions for SSB0 and SSB1, that is, the base station may map the SSBs, on the continuous SSB candidate positions, sequentially in an ascending order of the SSB index.

(2) As in (1), the whole SMTC is divided into a number of intervals, that is, a number of non-overlapping candidate-position sets. Each candidate-position set contains L candidate positions, where L is the number of SSBs in one complete SSB set. For one SMTC, after the LBT succeeds, the base station may select one of the candidate-position sets to transmit one SSB set. All candidate positions in the SMTC window or in the SSB transmission window are determined at an interval of a time unit required for one SSB set. Each candidate-position set may correspond to one complete SSB set consisting of L SSBs, and the L SSBs respectively correspond to SSB indexes 0~L−1. The positions of this SSB set in the candidate-position set are fixed. One SSB set actually transmitted by the base station may contain $L_d$ SSBs, where $L_d \leq L$. The method for determining the candidate-position set for one SSB set is also the same as that in (1), and will not be described again.

Differing from (1), if $L_e < L$, in order to increase the probability of transmitting the SSBs, it may be specified that, if the number of SSBs contained in one SSB set expected to be transmitted by the base station is $L_e < L$, and for the SSB indexes i and j, $$i \bmod \left\lceil \frac{L}{Le} \right\rceil = j \bmod \left\lceil \frac{L}{Le} \right\rceil \text{ (or } i \bmod Le = j \bmod Le\text{)}$$

or a difference between i and j is an integer multiple of $L_e$, the base station may attempt to transmit, on any SSB candidate position whose index is i or j, the SSB with the index corresponding to the candidate position, and $SSB_i$ and $SSB_j$ have the same beam direction. In an implementation, the base station may prepare L SSBs, i.e. $SSB_0$~$SSB_{L-1}$, in advance, and according to the result of LBT, the base station transmits, on the candidate position where the LBT succeeds, the SSB with the index corresponding to the candidate position, and the number of SSBs actually transmitted is $L_d \leq L_e$. Since the respective time when the LBT succeeds in each transmission window may be different, the SSBs contained in respective one SSB set in each transmission window may have different indexes.

Taking L=4 and $L_e$=2 for example, the base station expects to transmit two SSBs in different beam directions. The base station may transmit SSB0 on the candidate position of SSB0, or the base station may transmit SSB2 on the candidate position of SSB2, wherein the transmission of SSB0 and SSB2 uses the same beam, and the base station needs to transmit only one of SSB0 and SSB2 in one transmission window. Moreover, the base station may transmit SSB1 on the candidate position of SSB1, or the base station may transmit SSB3 on the candidate position of SSB3, wherein the transmission of SSB1 and SSB3 uses the same beam, and the base station needs to transmit only one of SSB1 and SSB3 in one transmission window. The base station may prepare 4 SSBs, i.e. SSB0~SSB3, in advance. It is assumed that in one SMTC window, the base station fails to complete the LBT before the start of SSB0 and SSB1, but completes the LBT before the start of SSB2. Then, the base station may transmit SSB2 and SSB3. As another example, if in the next STMC window the base station fails to complete the LBT before the start of SSB0 but completes the LBT before the start of SSB1, the base station may transmit SSB1 and SSB2, wherein transmission of SSB2 in the first SMTC window and transmission of SSB2 in the second SMTC window use the same beam, and transmission of SSB1 in the first SMTC window and transmission of SSB3 in the second SMTC window use the same beam. It can be seen that the SSBs actually transmitted in different SMTCs may have different indexes.

The base station may notify the UE of information about $L_e$ by system information or higher-level signaling. For example, $L_e$ may be determined from the parameter "ssb-PositionsInBurst" of the RMSI indicating which of the L SSBs are to be transmitted.

(3) The whole SMTC is divided into a number of intervals, that is, a number of non-overlapping candidate-position sets. Each candidate-position set contains $L_e$ candidate positions, where $L_e$ is the number of SSBs in one SSB set expected to be transmitted by the base station. For one SMTC, after the LBT succeeds, the base station may select one of the candidate-position sets to transmit one SSB set.

All candidate positions in the SMTC window or in the SSB transmission window are determined at an interval of a time unit required for one SSB set with a length of $L_e$.

Each candidate-position set may correspond to one complete set of $L_e$ SSBs. The $L_e$ SSBs may respectively correspond to the SSB indexes which are discontinuous or continuous, are different from each other, and are within a range of 0~L−1. The positions of this SSB set in the candidate-position set are fixed.

Figure 8B:
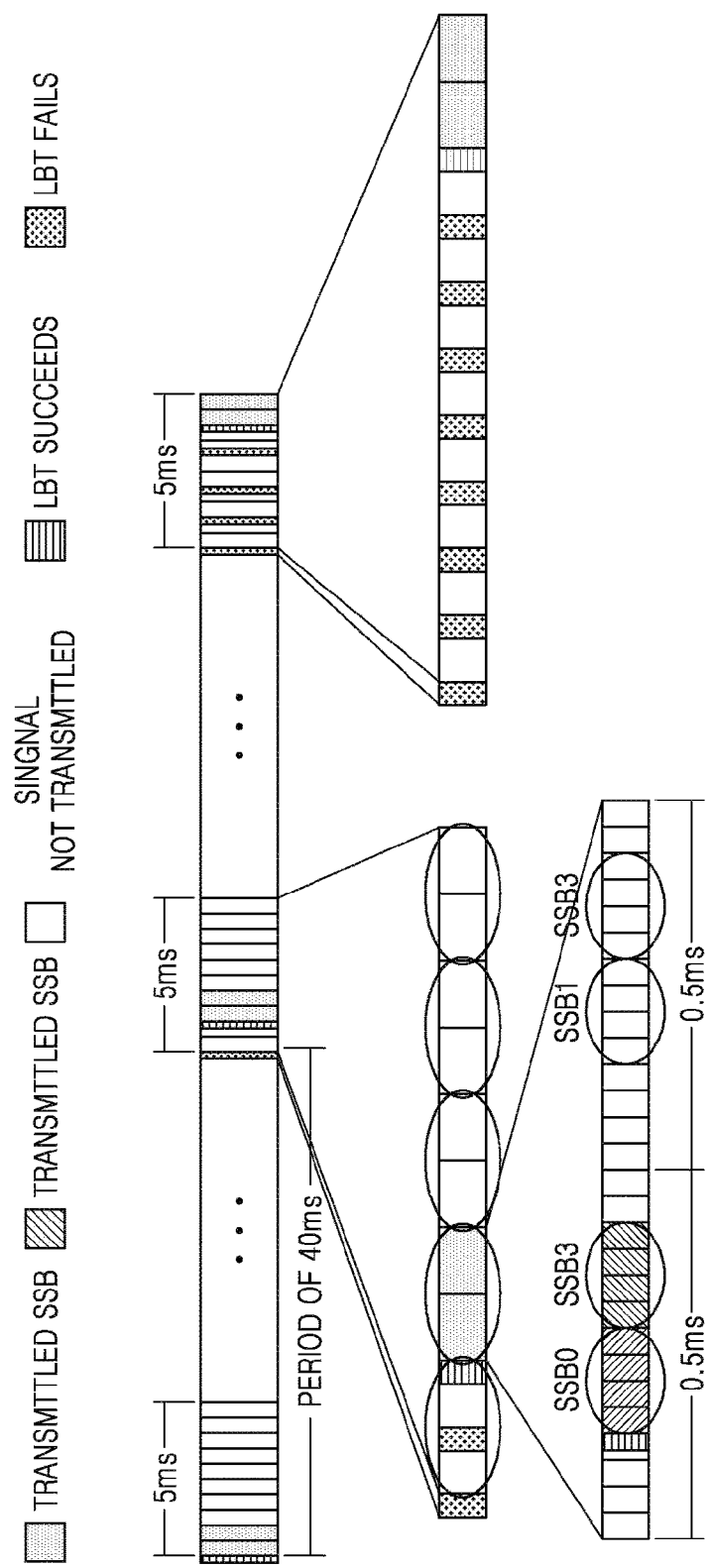
FIG. 8b is a schematic diagram of a sixth SSB transmission arrangement according to the present disclosure.

Regardless of whether the SSB indexes of the $L_e$ SSBs are continuous, in determining the candidate positions, the $L_e$ SSBs are mapped, sequentially in an ascending order of the SSB index, to the respective SSB candidate positions for one set of candidate SSBs. The index carried by an SSB itself may be referred to as an SSB actual index, and an index, in one SSB set with a length of $L_e$, determined in an ascending order of the SSB actual index may be referred to as an SSB logical index. For example, if L=4, $L_e$=2, and SSB1 and SSB3 are expected to be transmitted by the base station, one set of SSB candidate positions may contain two SSB candidate positions respectively with the logical indexes SSB0_ and SSB1_. The logical index of SSB1 is SSB0, and the logical index of SSB3 is SSB1_. For example, as shown in FIG. 8b, a subcarrier interval of 30 KHz and L=4 are taken for example. In the transmission window with a duration of 5 ms, there are 20 candidate positions, and there are 4 candidate positions every 1 ms. Assuming $L_e$=2, the 20 candidate positions may be divided into 10 SSB candidate-position sets, each set containing 2 SSB candidate positions with logical indexes SSB0_ and SSB1_, respectively. Assuming that SSB1 and SSB3 are expected to be transmitted by the base station, the logical index of SSB1 is SSB0_ and the logical index of SSB3 is SSB1_according to an ascending order of the SSB indexes. If the base station successfully completes the LBT before any of the candidate-position sets, the base station may transmit the two SSBs on the corresponding candidate-position set. In FIG. 8b, in the second SMTC, the base station does not complete the LBT before slots 0, 1, and 2, but completes the LBT on the first SSB candidate position of slot 3, and then the base station may transmits in slot 3 one SSB set containing SSB1 and SSB3; in the third SMTC, the base station does not complete the LBT until slot 9, and then the base station may transmit in slot 9 one SSB set containing SSB1 and SSB3. The resources for SSB1 and SSB3 are in close proximity.

The base station may notify the UE of information about $L_e$ by system information or higher-level signaling. For example, $L_e$ may be determined from the parameter "ssb-PositionsInBurst" of the RMSI (also referred as to SIB1) indicating which of the L SSBs are to be transmitted.

Similarly to (1), a candidate-position set for one SSB set may be determined further based on whether a complete SSB set with a length of $L_e$ may be mapped. Thus, for each candidate-position set with a length sufficient to transmit one SSB set, the number $L_d$ of SSBs contained in one SSB set actually transmitted by the base station remains unchanged, and $L_d=L_e$. Alternatively, a candidate-position set for one SSB set may be determined as only positions that map a part of the one SSB set, and the number of SSBs contained in one SSB set actually transmitted by the base station is $L_d \le L_e$.

Similarly to (1), in one SMTC window or the SSB transmission window, the base station may attempt to transmit one SSB set with a length of $L_e$ on multiple candidate-position sets. The base station may perform the LBT before each candidate-position set. If the LBT succeeds before a certain candidate-position set, the base station may transmit one SSB set on this candidate-position set, and may not transmit SSBs on the other candidate-position sets. In another implementation, one SSB set with a length of $L_e$ is divided into $L_{LBT}$ subsets, the LBT is necessary for each subset, and the SSBs in the same subset may be continuously transmitted.

(4) The entire SMTC is divided, in units of the time required for an initial SSB set in the SMTC, into a number of intervals, that is, a number of non-overlapping candidate-position sets. Each candidate-position set has a length sufficient to transmit one SSB set. The candidate positions in the candidate-position set correspond to the SSB indexes 0~L−1, respectively. If the length of the last candidate-position set is not sufficient to transmit one complete SSB set, the candidate positions in the candidate-position set correspond to SSB indexes 0, 1, . . . . In one SMTC, after the LBT succeeds at any time, the base station continuously transmits from any of the candidate positions SSBs with respective indexes corresponding to the candidate positions.

Candidate positions of all SSB sets in the SMTC window or in the SSB transmission window are determined at an interval of a time unit required for one SSB set. A candidate position of an SSB in the candidate positions of a set of SSBs is determined at an interval of a time unit required for one SSB. The candidate position of an SSB is determined according to the SSB index of the SSB, that is, the index of the transmitted SSB must be equal to the index of the SSB candidate position where the SSB is.

In one SMTC window or in an SSB transmission window, the base station may attempt to transmit SSBs on multiple SSB candidate-position sets. The base station may perform the LBT before each candidate-position set. If the LBT succeeds before a certain candidate-position set, the base station may transmit SSBs on this candidate-position set, and may not transmit SSBs on the other candidate-position sets. In one implementation, the base station may continuously transmit one SSB set, starting from this candidate-position set. The number of SSBs contained in one SSB set actually transmitted is $L_d \le L$. $L_d$ is the same for every transmission, and $L_d=L_e$. The base station may notify the UE of information about $L_e$ by system information or higher-level signaling. For example, $L_e$ may be determined from the parameter "ssb-PositionsInBurst" of the RMSI indicating which of the L SSBs are to be transmitted. In another implementation, the base station may continuously transmit one SSB set or a part of the SSBs, starting from this candidate position. For example, if there are candidate positions only for a part of SSBs from this candidate position to the end position of the window, $L_d$ may be different for every transmission, where $L_d \le L_e$. In another implementation, one SSB set is divided into $L_{LBT}$ subsets, the LBT is necessary for each subset, and the SSBs in the same subset may be continuously transmitted. The base station may continuously transmit one SSB subset, starting from this candidate position. Moreover, after the subset is transmitted, the base station may attempt to perform the LBT, and determine whether to transmit SSBs of the next subset of the same set according to the LBT result. The LBT before the first subset in one SSB set may be different from the LBTs before the other subsets in the set. For example, the LBT before the first subset is a more conservative LBT, for example, with a longer slot of the CCA or a larger direction angle of the CCA; and the following LBTs may be faster, for example, an LBT of 25 μs or with a direction of the CCA containing only the direction of this subset. If all the LBTs fail, the base station does not transmit the SSBs in one SMTC window or the SSB transmission window.

If the slot occupied by one SSB set substantially corresponds to the duration of the SMTC window or the SSB transmission window (for example, the duration is 5 ms and the slot occupied by one SSB set is 4 ms), and the number of SSBs expected to be transmitted by the base station is $L_d=L$, Method (1) cannot increase the probability of transmitting the SSBs, but method (4) may significantly increase the probability of transmitting the SSBs.

Figure 9A:
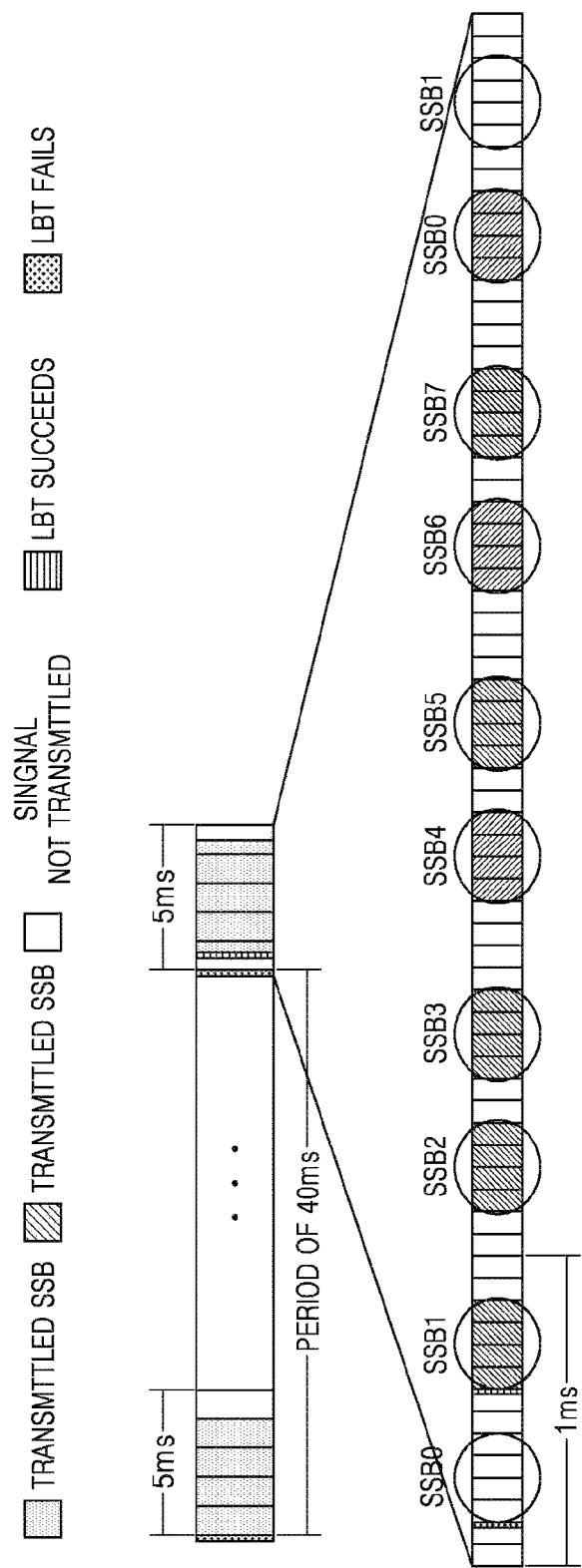
FIG. 9a is a schematic diagram of a seventh SSB transmission arrangement according to the present disclosure.

As shown in FIG. 9a, a subcarrier interval of 15 KHz and L=8 are taken for example. The slot required for one SSB set is 4 ms. If $L_e=L$, the transmission probability cannot be improved by method (1). According to method (4), it is assumed that the time resource required for one SSB is half a slot, i.e. 0.5 ms. According to a pattern of the SSB, the candidate positions of all slots in the SMTC window are determined and numbered as SSB0, SSB1, . . . , SSB7, SSB0, SSB1, respectively. It can be seen that there are two candidate-position sets respectively corresponding to two SSB sets. The first candidate-position set contains one complete SSB set, and the second candidate-position set contains only SSB0 and SSB1. Both the first candidate-position set and the second candidate-position set correspond to SSB0 and SSB1, and only the first candidate-position set corresponds to SSB2~SSB7. For an SSB, the base station may transmit the SSB only on a position of the candidate positions corresponding to the SSB index. For example, if the base station needs to transmit 8 SSBs, there are only three possible selections: (a) completing the LBT before the first SSB, and transmitting SSB0~SSB7 (starting from the first SSB0 position); (b) completing the LBT before the second SSB, transmitting SSB1-SSB7 (starting from the first SSB1 position), and transmitting SSB on the second SSB0 position; and (c) completing the LBT before the third SSB, transmitting SSB2~SSB7 (starting from the SSB2 position), and transmitting SSB0 and SSB1 respectively on the second SSB0 position and the second SSB1 position. If the base station is allowed to transmit only a part of one SSB set expected to be transmitted, for example, the base station expects to transmit 8 SSBs, but the base station does not complete the LBT until the 5$^{th}$ SSB, the base station may transmit SSB4~SSB7 (starting from the first SSB4 position), and transmit SSB0 and SSB1 respectively on the second SSB0 position and the second SSB1 position. In this case, the base station does not transmit SSB2 and SSB3. In the next SMTC, the number of SSBs finally transmitted by the base station according to LBT condition may be different from the number of SSBs transmitted in the previous SMTC.

In this method, candidate-positions for one SSB set may be determined further based on whether a complete SSB set may be mapped.

The UE may assume that, in a long time, if respective one SSB set is transmitted in each SMTC window, the respective one SSB set in each SMTC window consists of SSBs with the same indexes. For example, if L=8, $L_e$=2, and SSB2 and SSB3 are expected to be transmitted by the base station, the respective one SSB set transmitted in each SMTC window consists of SSB2 and SSB3 if the base station successfully completes the LBT. If the length of the last candidate-position set in one SMTC window is not sufficient to contain L SSBs, the respective one SSB set in each SMTC window may consist of SSBs with the slightly different indexes.

When $L_e \le L$, if the indexes of the SSBs expected to be transmitted by the base station are continuous (for example, L=8, $L_e$=2, and the indexes of the SSBs are 2 and 3), the base station may attempt to transmit SSB2 and SSB3 on the candidate positions therefor.

If the indexes of the SSBs expected to be transmitted by the base station are discontinuous (for example, L=8, $L_e$=2, and the indexes of the SSBs are 1 and 3), the base station may attempt to transmit SSB1 and SSB3 on the candidate positions therefor. In another implementation, the base station may attempt to sequentially transmit SSB1 and SSB3 on the candidate positions for SSB0 and SSB1.

(5) As in (4), the entire SMTC is divided, in units of the time required for an initial SSB set in the SMTC, into a number of intervals, that is, a number of non-overlapping candidate-position sets. Each candidate-position set has a length sufficient to transmit one SSB set. The candidate positions in the candidate-position set correspond to the SSB indexes 0~L−1, respectively. If the length of the last candidate-position set is not sufficient to transmit one complete SSB set, the candidate positions in the candidate-position set correspond to SSB indexes 0, 1, . . . . In one SMTC, after the LBT succeeds at any time, the base station continuously transmits from any of the candidate positions SSBs with respective indexes corresponding to the candidate positions. Candidate positions of all SSB sets in the SMTC window or in the SSB transmission window are determined at an interval of a time unit required for one SSB set. A candidate position of an SSB in the candidate positions of a set of SSBs is determined at an interval of a time unit required for one SSB. The candidate position of an SSB is determined according to the SSB index of the SSB, that is, the index of the transmitted SSB must be equal to the index of the SSB candidate position where the SSB is. The method for determining the candidate-position set for one SSB set is also the same as that in (4), and will not be described again.

Differing from (4), if $L_e$<L, in order to increase the probability of transmitting the SSBs, it may be specified that, if the number of SSBs contained in one SSB set expected to be transmitted by the base station is $L_e$<L, and for the SSB indexes i and j, $$i \bmod \left\lceil \frac{L}{Le} \right\rceil = j \bmod \left\lceil \frac{L}{Le} \right\rceil \text{ (or } i \bmod Le = j \bmod Le\text{),}$$

the base station may attempt to transmit, on any SSB candidate position whose index is i or j, the SSB with the index corresponding to the candidate position, and $SSB_i$ and $SSB_j$ have the same beam direction. In an implementation, the base station may prepare L SSBs, i.e. $SSB_0$~$SSB_{L-1}$, in advance, and according to the result of LBT, the base station transmits, on the candidate position where the LBT succeeds, the SSB with the index corresponding to the candidate position, and the number of SSBs actually transmitted is $L_d \le L_e$. Since the respective time when the LBT succeeds in each transmission window may be different, the SSBs contained in respective one SSB set in each transmission window may have different indexes.

Taking FIG. 9a for example, L=8, and the slot required for one SSB set is 4 ms. Assuming $L_e$=2, the base station may attempt to transmit, on the $1^{th}$ SSB0 candidate position, the SSB2 candidate position, the SSB4 candidate position, the SSB6 candidate position and the $2^{th}$ SSB0 candidate position, respective one SSB having the same index as the candidate position, and the SSBs on these candidate positions have the same beam, that is, the SSB with the same beam has four chances to be transmitted in one window; or alternatively, the base station may attempt to transmit, on the $1^{th}$ SSB1 candidate position, the SSB3 candidate position, the SSB5 candidate position, the SSB7 candidate position and the $2^{th}$ SSB1 candidate position, respective one SSB having the same index as the candidate position, and the SSBs on these candidate positions have the same beam, that is, the SSB with the same beam has four chances to be transmitted in one window. If the base station does not complete the LBT until before the start of SSB4 in the first SMTC, the base station may transmit SSB4 and SSB5 in this SMTC; if the base station does not complete the LBT until before the start of SSB7 in the next SMTC, the base station may transmit SSB7 and SSB0 in the next SMTC, wherein SSB4 corresponds to SSB0, and SSB5 corresponds to SSB7.

The base station may notify the UE of information about $L_e$ by system information or higher-level signaling. For example, $L_e$ may be determined from the parameter "ssb-PositionsInBurst" of the RMSI indicating which of the L SSBs are to be transmitted.

(6) The entire SMTC is divided, in units of the time required for an initial SSB set in the SMTC, into a number of intervals, that is, a number of non-overlapping candidate-position sets. Each candidate-position set has a length sufficient to transmit one SSB set with a length of $L_e$. The candidate positions in the candidate-position set respectively correspond to $L_e$ SSB indexes in sequence. The $L_e$ SSB indexes are sorted in an ascending order, and may be discontinuous or continuous within a range of 0~L−1. The index carried by an SSB itself may be referred to as an SSB actual index, and an index, in one SSB set with a length of $L_e$, determined in an ascending order of the SSB actual index may be referred to as an SSB logical index. For example, if L=4, $L_e$=2, and SSB1 and SSB3 are expected to be transmitted by the base station, one set of SSB candidate positions may contain two SSB candidate positions respectively with the logical indexes SSB0_ and SSB1_. The logical index of SSB1 is SSB0_, and the logical index of SSB3 is SSB1_. If it is predefined that, when $L_e$<L, the SSB actual indexes of the SSBs expected to be transmitted by the base station must be continuous and start from SSB0, the SSB actual index is equal to the SSB logical index.

If the length of the last candidate-position set is not sufficient to transmit one complete SSB set with a length of $L_e$, the candidate positions in the candidate-position set are sorted in an ascending order of the SSB logical index, and the remaining SSBs not corresponding to any candidate position are not transmitted. In one SMTC, after the LBT succeeds at any time, the base station continuously transmits from any of the candidate positions SSBs with respective logical indexes corresponding to the candidate positions.

The candidate positions of all SSB sets in the SMTC window or in the SSB transmission window are determined at an interval of a time unit required for one SSB set with a length of $L_e$. A candidate position of an SSB in the candidate positions of a set of SSBs is determined at an interval of a time unit required for one SSB. The candidate position of an SSB is determined according to the SSB logical index of the SSB, that is, the logical index of the transmitted SSB must be equal to the logical index of the SSB candidate position where the SSB is.

In one SMTC window or in an SSB transmission window, the base station may attempt to transmit SSBs on multiple SSB candidate-position sets. The base station may perform the LBT before each candidate-position set. If the LBT succeeds before a certain candidate-position set, the base station may transmit SSBs on this candidate-position set, and may not transmit SSBs on the other candidate-position sets. In one implementation, the base station may continuously transmit one SSB set, starting from this candidate-position set. The number of SSBs contained in one SSB set actually transmitted is $L_d=L_e$, and $L_d$ is the same for every transmission. In another implementation, the base station may continuously transmit one SSB set or a part of the SSBs, starting from this candidate position. For example, if there are candidate positions only for a part of SSBs from this candidate position to the end position of the window, $L_d$ may be different for every transmission, where $L_d \leq L_e$. In another implementation, one SSB set is divided into $L_{LBT}$ subsets, the LBT is necessary for each subset, and the SSBs in the same subset may be continuously transmitted. The base station may continuously transmit one SSB subset, starting from this candidate position. Moreover, after the subset is transmitted, the base station may attempt to perform the LBT, and determine whether to transmit SSBs of the next subset of the same set according to the LBT result.

Figure 9B:
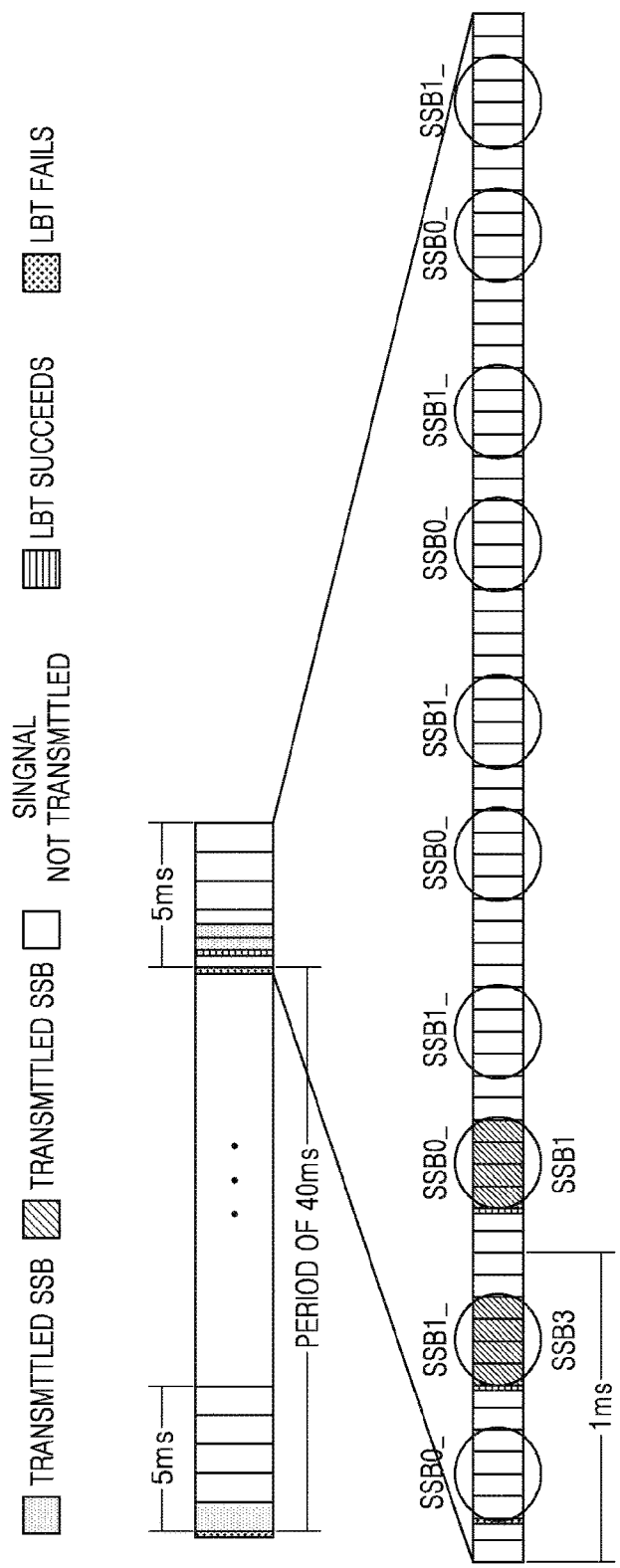
FIG. 9b is a schematic diagram of an eighth SSB transmission arrangement according to the present disclosure.

As shown in FIG. 9b, a subcarrier interval of 15 KHz and L=8 are taken for example. The slot required for one complete SSB set with a length of L is 4 ms. According to method (6), it is assumed that $L_e=2$, the SSB actual indexes are respectively SSB1 and SSB3, and the SSB logical indexes are respectively SSB0_ and SSB1_. The time resource required for one SSB is half a slot (i.e. 0.5 ms). According to a pattern of the SSB, it is determined that there are 10 candidate positions of all slots in the SMTC window, and their logical indexes are respectively SSB0_, SSB1_, ..., SSB0_. SSB1_. It can be seen that there are 5 candidate-position sets respectively corresponding to 5 SSB sets. There are 5 candidate-position sets corresponding to SSB1 and SSB3 respectively with logical indexes SSB_ and SSB1_. For an SSB, the base station may transmit the SSB only on a position of the candidate positions corresponding to the logical index of the SSB. For example, if the base station needs to transmit the two SSBs, and the LBT is completed before any of the 5 SSB0_candidate positions, the base station may sequentially transmit SSB1 and SSB3; or if the LBT is completed before any of the first 4 SSB1_candidate positions, the base station may sequentially transmit SSB3 and SSB1; or if the LBT is completed before the last SSB1_candidate position, the base station may transmit SSB3.

In the method, the candidate positions of one SSB set may be determined further based on whether one SSB set with a length of $L_e$ may be mapped.

The base station may notify the UE of information about $L_e$ by system information or higher-level signaling. For example, $L_e$ may be determined from the parameter "ssb-PositionsInBurst" of the RMSI (also referred as to SIB1) indicating which of the L SSBs are to be transmitted.

(7) One SMTC is divided into a number of intervals, that is, a number of candidate-position sets. Each candidate-position set has a length sufficient to transmit one SSB. After the base station completes the LBT, the base station may continuously transmit the SSBs, starting from any candidate position in any candidate-position set. Starting from any SSB index, the transmission of the SSBs may be not in order of the SSB index, or may sequentially loop.

Candidate positions of all SSB sets in the SMTC window or in the SSB transmission window are determined at an interval of a time unit required for one SSB set. A candidate position of an SSB in the candidate positions of a set of SSBs is determined at an interval of a time unit required for one SSB. A candidate position of an SSB is any of the candidate positions of a set of SSBs.

In one SMTC window, the base station may attempt to transmit SSBs on multiple SSB candidate-positions. The base station may perform the LBT before each candidate-position. If the LBT succeeds before a certain candidate-position, the base station may continuously transmit one SSB set, starting from this candidate-position, and may not transmit SSBs on the other candidate-positions. The number of SSBs contained in one SSB set actually transmitted is $L_d \leq L$, and $L_d$ is the same for every transmission. In another implementation, the base station may continuously transmit one SSB set or a part of the SSBs, starting from this candidate position. For example, if there are candidate positions only for a part of SSBs from this candidate position to the end position of the window, $L_d$ may be different for every transmission. In another implementation, one SSB set is divided into $L_{LBT}$ subsets, the LBT is necessary for each subset, and the SSBs in the same subset may be continuously transmitted. The base station may continuously transmit one SSB subset, starting from this candidate position. After the subset is transmitted, the base station may attempt to perform the LBT, and determine whether to transmit SSBs of the next subset of the same set according to the LBT result. If the LBT succeeds, the base station may continue the transmission until the entire SSB set is transmitted. The LBT before the first subset in one SSB set may be different from the LBTs before the other subsets in the set. For example, the LBT before the first subset is a more conservative LBT, for example, with a longer slot of the CCA or a larger direction angle of the CCA; and the following LBTs may be faster, for example, an LBT of 25 μs or with a direction of the CCA containing only the direction of this subset. If all the LBTs fail, the base station does not transmit the SSBs in one SMTC window or the SSB transmission window.

Figure 10A:
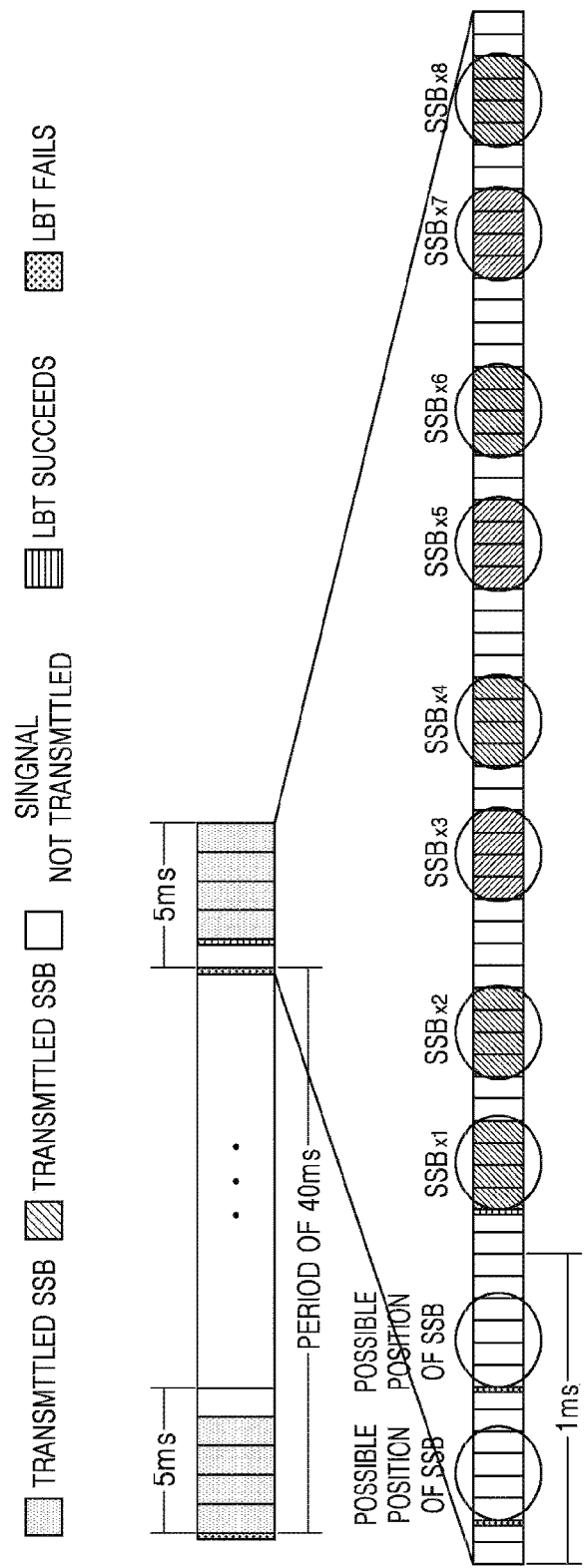
FIG. 10a is a schematic diagram of a ninth SSB transmission arrangement according to the present disclosure.

As shown in FIG. 10a, a subcarrier interval of 15 KHz and L=8 are taken for example. The slot required for one SSB set is 4 ms. First, according to a pattern of the SSB, the candidate positions of all slots in the SMTC window are determined and numbered as SSB0, SSB1, ..., SSB7, SSB0, SSB1, respectively. The base station may transmit an SSB on any of the candidate positions, and it is not defined that the SSB index of the transmitted SSB should be equal to the index of the candidate position thereof. That is, for any SSB, there are 10 candidate positions in total. This has an advantage that there are more candidate positions for transmitting one SSB. In some scenarios, before transmitting an SSB in a direction of i, the base station needs to perform the LBT in the direction of i. Since the SSB in the direction of i may be transmitted on any of the candidate positions, the transmission probability is improved. As shown in FIG. 10a, the UE does not complete the LBT on the first and second candidate positions, but completes the LBT on the third candidate position. Thus, one SSB set may be transmitted, starting from the third candidate position. The base station may transmit an SSB with any SSB index, for example, SSB0, SSB1, ..., SSB7, or SSB2, SSB3, ..., SSB7, SSB0, SSB1, or in another order.

In this method, candidate-positions for one SSB set may be determined further based on whether a complete SSB set may be mapped.

(8) One SMTC is divided into a number of intervals, that is, a number of candidate-position sets. Each candidate-position set has a length sufficient to transmit one SSB with a length of $L_e$. After the base station completes the LBT, the base station may continuously transmit the SSBs, starting from any candidate position in any candidate-position set. Starting from any SSB index, the transmission of the SSBs may be not in order of the SSB index, or may sequentially loop.

Candidate positions of all SSB sets in the SMTC window or in the SSB transmission window are determined at an interval of a time unit required for one SSB set. A candidate position of an SSB in the candidate positions of a set of SSBs is determined at an interval of a time unit required for one SSB. A candidate position of an SSB is any of the candidate positions of a set of SSBs.

In one SMTC window, the base station may attempt to transmit SSBs on multiple SSB candidate-positions. The base station may perform the LBT before each candidate-position. If the LBT succeeds before a certain candidate-position, the base station may continuously transmit one SSB set, starting from this candidate-position, and may not transmit SSBs on the other candidate-positions. The number of SSBs contained in one SSB set actually transmitted is $L_d = L_e$, and $L_d$ is the same for every transmission. In another implementation, the base station may continuously transmit one SSB set or a part of the SSBs, starting from this candidate position. For example, if there are candidate positions only for a part of SSBs from this candidate position to the end position of the window, $L_d$ may be different for every transmission, and $L_d \leq L_e$. In another implementation, one SSB set is divided into $L_{LBT}$ subsets, the LBT is necessary for each subset, and the SSBs in the same subset may be continuously transmitted. The base station may continuously transmit one SSB subset, starting from this candidate position. After the subset is transmitted, the base station may attempt to perform the LBT, and determine whether to transmit SSBs of the next subset of the same set according to the LBT result. If the LBT succeeds, the base station may continue the transmission until the entire SSB set with a length of $L_e$ is transmitted.

Figure 10B:
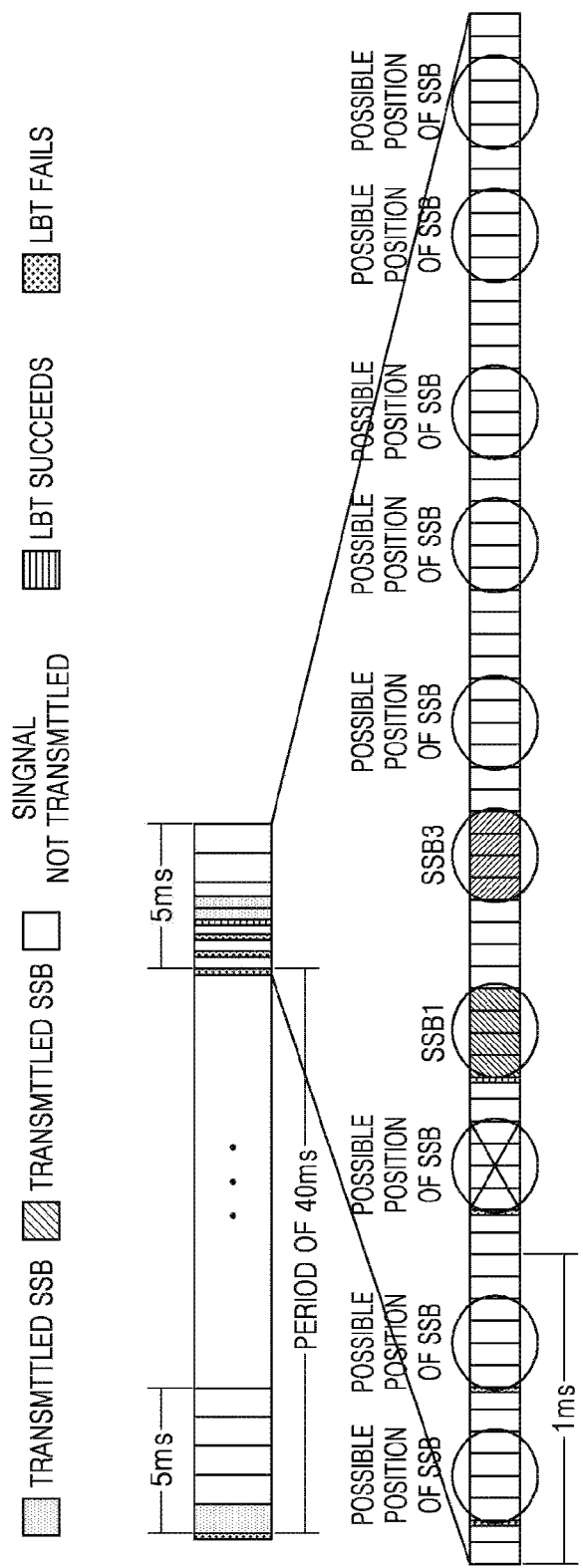
FIG. 10b is a schematic diagram of a tenth SSB transmission arrangement according to the present disclosure.

As shown in FIG. 10b, a subcarrier interval of 15 KHz and L=8 are taken for example. The slot required for one SSB set is 4 ms. First, according to a pattern of the SSB, the candidate positions of all slots in the SMTC window are determined, and there are 10 candidate positions in total. The base station may transmit an SSB on any of the candidate positions, and it is not defined that the SSB index of the transmitted SSB should be equal to the index of the candidate position thereof. That is, for any SSB, there are 10 candidate positions in total. This has an advantage that there are more candidate positions for transmitting one SSB. According to method (8), it is assumed that $L_e=2$, and the SSB actual indexes are SSB1 and SSB3. As shown in FIG. 10b, the UE does not complete the LBT on the $1^{th}$ to $3^{th}$ candidate positions, but completes the LBT on the $4^{th}$ candidate position. Thus, one SSB set with a length of $L_e$ may be transmitted, starting from the $4^{th}$ candidate position. The base station may transmit an SSB with any SSB index, for example, SSB1 and SSB3, or SSB3 and SSB1.

In this method, candidate-positions for one SSB set may be determined further based on whether a complete SSB set may be mapped.

The base station may notify the UE of information about $L_e$ by system information or higher-level signaling. For example, $L_e$ may be determined from the parameter "ssb-PositionsInBurst" of the RMSI indicating which of the L SSBs are to be transmitted.

(9) One SMTC is divided into a number of candidate-position sets that may partially overlap with each other. Each candidate-position set has a length sufficient to transmit one SSB set.

All candidate positions in the SMTC window or in the SSB transmission window are determined at an interval of a time unit of one slot or subframe (fixedly 1 ms).

Each candidate-position set may correspond to one complete SSB set consisting of L SSBs. The number of SSBs contained in one SSB set actually transmitted by the base station is $L_d \leq L$, and the number of SSBs actually transmitted by the base station is $L_d \leq L_e$.

Figure 11A:
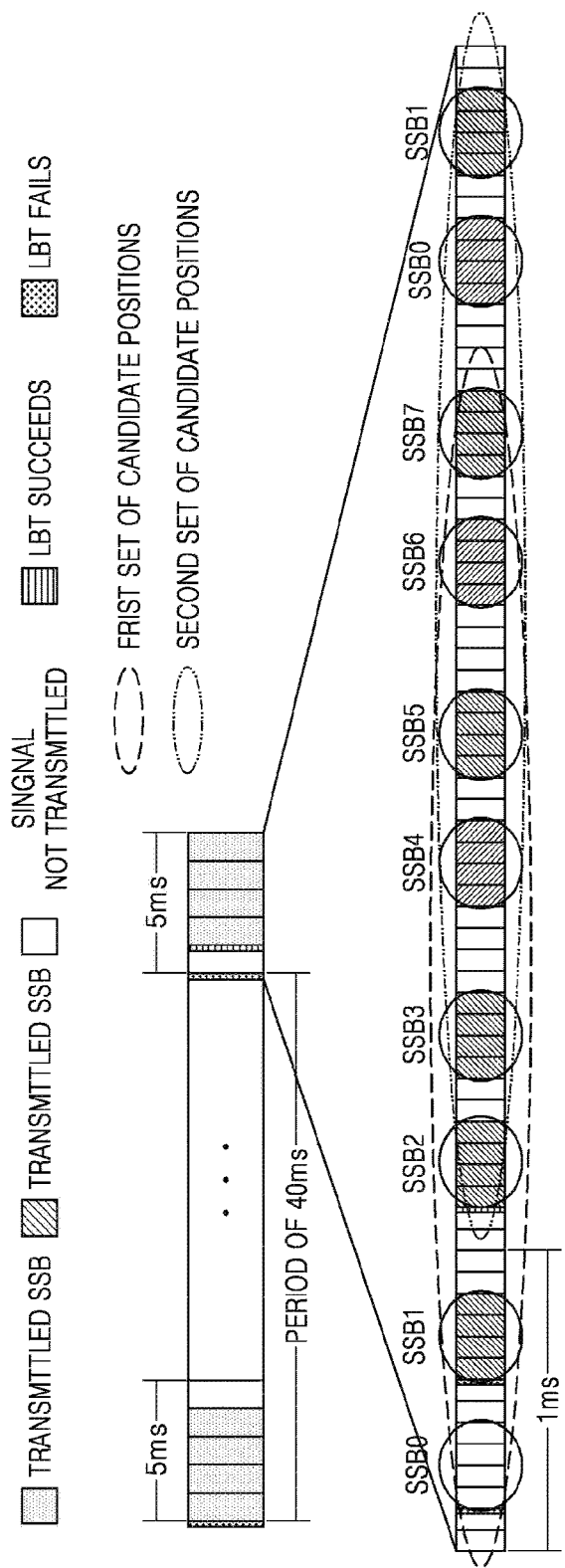
FIG. 11a is a schematic diagram of an eleventh SSB transmission arrangement according to the present disclosure.

As shown in FIG. 11a, one SSB set contains 8 SSBs and occupies 4 ms. Candidate-position sets are determined at an interval of a subframe of 1 ms. Assuming that each candidate-position set needs to contain positions of all the L SSBs, there are only two candidate-position sets in a window of 5 ms. The first candidate-position set occupies 4 ms starting from the start of 5 ms, and the second candidate-position set occupies 4 ms starting from the $2^{nd}$ ms of 5 ms, that is, from the $2^{nd}$ ms to the $5^{th}$ ms.

In one implementation, similarly to method (4), the candidate position of an SSB is determined according to the SSB index of the SSB. In FIG. 11a, the base station completes the LBT before the start of the $2^{nd}$ ms in the window of 5 ms, that is, before the second candidate-position set. Thus, SSB2, SSB3, . . . , SSB7, SSB0, SSB1 are sequentially transmitted.

In another implementation, candidate positions in a candidate-position set are numbered from 0 to L−1. In FIG. 11a, the base station completes the LBT before the start of the $2^{nd}$ ms in the window of 5 ms, that is, before the second candidate-position set. Thus, SSB0, SSB1, . . . , SSB7 should be sequentially transmitted.

(10) As in (9), one SMTC is divided into a number of candidate-position sets that may partially overlap with each other. Each candidate-position set has a length sufficient to transmit one SSB set. All candidate positions in the SMTC window or in the SSB transmission window are determined at an interval of a time unit of one slot or subframe (fixedly 1 ms). Each candidate-position set may correspond to one complete SSB set consisting of L SSBs. The number of SSBs contained in one SSB set actually transmitted by the base station is $L_d \leq L$, and the number of SSBs actually transmitted by the base station is $L_d \leq L_e$.

Differing from (9), if $L_e < L$, in order to increase the probability of transmitting the SSBs, it may be specified that, if the number of SSBs contained in one SSB set expected to be transmitted by the base station is $L_e < L$, and for the SSB indexes i and j in one candidate-position set, $$i \bmod \left\lceil \frac{L}{Le} \right\rceil = j \bmod \left\lceil \frac{L}{Le} \right\rceil \text{ (or } i \bmod Le = j \bmod Le\text{)},$$

the base station may attempt to transmit, on any SSB candidate position whose index is i or j, the SSB with the index corresponding to the candidate position, and $SSB_i$ and $SSB_j$ have the same beam direction. In an implementation, the base station may prepare L SSBs, i.e. $SSB_0 \sim SSB_{L-1}$, in advance, and according to the result of LBT, the base station transmits, on the candidate position where the LBT succeeds, the SSB with the index corresponding to the candidate position, and the number of SSBs actually transmitted is $L_d \leq L_e$. Since the respective time when the LBT succeeds in each transmission window may be different, the SSBs contained in respective one SSB set in each transmission window may have different indexes.

(11) One SMTC is divided into a number of candidate-position sets that may partially overlap with each other. Each candidate-position set has a length sufficient to transmit one SSB set with a length of $L_e$.

All candidate positions in the SMTC window or in the SSB transmission window are determined at an interval of a time unit of one slot or subframe (fixedly 1 ms).

Each candidate-position set may correspond to one complete set of $L_e$ SSBs. The number of SSBs contained in one SSB set actually transmitted by the base station is $L_d \leq L_e$.

Figure 11B:
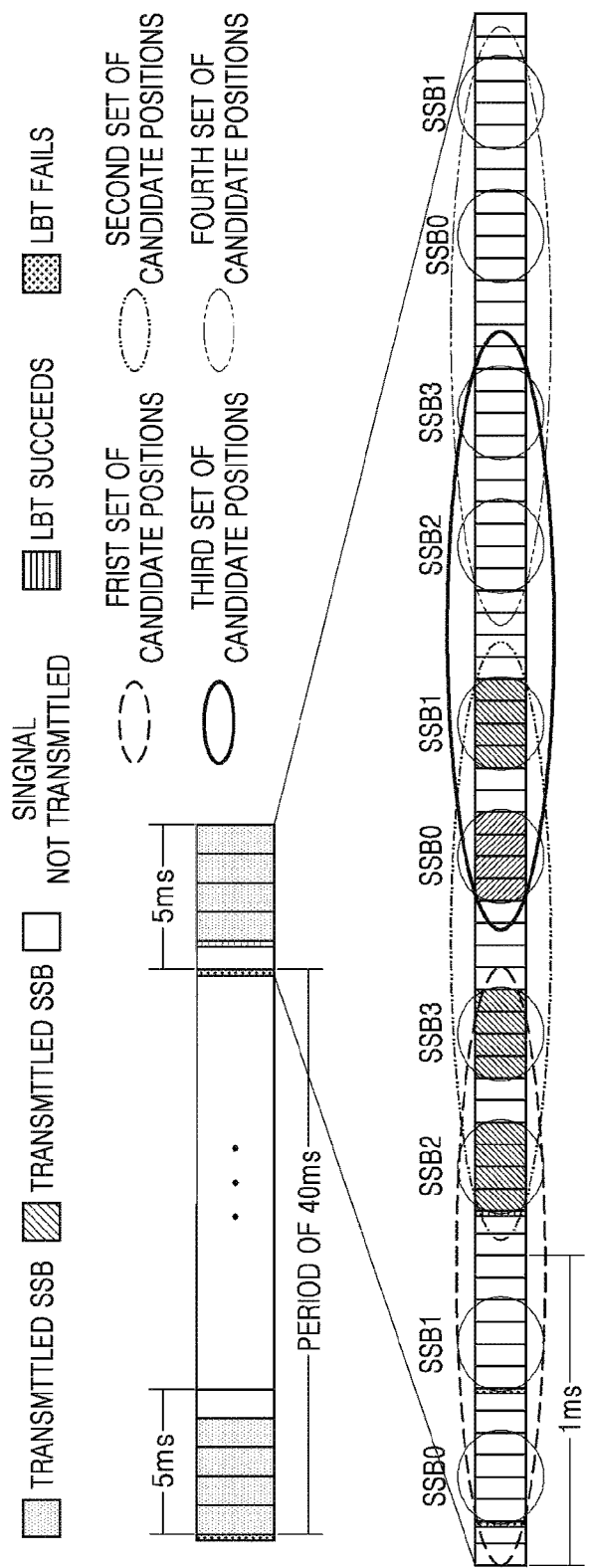
FIG. 11b is a schematic diagram of a twelfth SSB transmission arrangement according to the present disclosure.

In one implementation, similarly to method (6), the candidate position of an SSB is determined according to the logical index of the SSB. If it is predefined that, when $L_e < L$, the SSB actual indexes of the SSBs expected to be transmitted by the base station must be continuous and start from SSB0, the SSB actual index is equal to the SSB logical index. Assuming that L=8, $L_e$=4, and SSB0, SSB1, SSB3 and SSB7 are expected to be transmitted. In FIG. 11b, the base station completes the LBT before the start of the $2^{nd}$ ms in the window of 5 ms, that is, before the second candidate-position set. The second candidate-position set contains logical indexes SSB2_, SSB3_, SSB_0, and SSB1_. Thus, SSB3, SSB7, SSB0, SSB1 are sequentially transmitted.

In another implementation, candidate positions in a candidate-position set are logically numbered from 0 to $L_e$−1. In FIG. 11b, the base station completes the LBT before the start of the $2^{nd}$ ms in the window of 5 ms, that is, before the second candidate-position set. Thus, SSBs respectively with the logical indexes SSB0_, SSB1_, SSB2_ and SSB3_should be sequentially transmitted.

For methods (3), (6), (8) and (11), if $L_e < L$, the logical index of the SSB candidate position is determined according to $L_e$, and the resources occupied by each SSB candidate position are determined according to one SSB set containing $L_e$ SSBs. In another implementation, if $L_e < L$, the logical index of the SSB candidate position is determined according to $L_e$, but the resources occupied by each SSB candidate position are determined according to one SSB set containing L SSBs.

In an actual system, it may occur that the start point of the SMTC is not at the start point of the former half or the latter half of the SF. In one implementation, the SSB candidate position in the SMTC is determined in accordance with the methods described above. For example, assuming that the start point of the window of 5 ms shown in FIG. 9a is the $3^{rd}$ ms, that is, the window is from the $3^{rd}$ ms to the $7^{th}$ ms. Although the start point is not a multiple of 5 ms, i.e. being not the start point of the former half or the latter half of the SF, 10 SSB candidate positions are determined still from the start point of the SMTC. In another implementation, the SSB candidate positions may be determined based on the methods described above and further according to a relation between the SMTC window and the SSB transmission window or according to a relation between the start point of the SMTC window and the start point of the former half or latter half of the SF. For example, only the resources for the SSBs in the SMTC corresponding to the SSBs in the SSB transmission window may be regarded as the SSB candidate positions. The resources outside the SSB transmission window and in the SMTC window are not the SSB candidate positions, and the base station cannot attempt to transmit the SSBs on these positions, wherein the start point of the SSB transmission window is the start point of the former half or the latter half of a specific SF. For example, assuming that the start point of the window of 5 ms shown in FIG. 9a is the $3^{rd}$ ms, that is, the window is from the $3^{rd}$ ms to the $7^{th}$ ms, and that the start point of the SSB transmission window is the $5^{th}$ ms, then only 6 SSB candidate positions from the $5^{th}$ ms to the $7^{th}$ ms in the SMTC are determined, and the 6 SSB candidate positions should correspond to SSB0~SSB5, respectively. In still another implementation, it may defined that the base station should configure the SMTC so that the start point of the SMTC window is the start point of the former half or the latter half of an SF.

Since the LBT needs to be performed before the signal is transmitted, and the length-of-time T, for which continuous transmission can be performed after the LBT succeeds, is related to the number of CCAs (carrier detections) of the LBT, that is, the longer T is, the more the number of CCAs required is. Thus, one SSB set to be transmitted may be arranged as compactly in time as possible, which helps to shorten the length-of-time T for transmitting one SSB set, so that all the SSBs could be continuously transmitted once the LBT succeeds, or the number of CCAs of the LBT may be reduced and the probability that the LBT succeeds may be increased.

Figure 12:
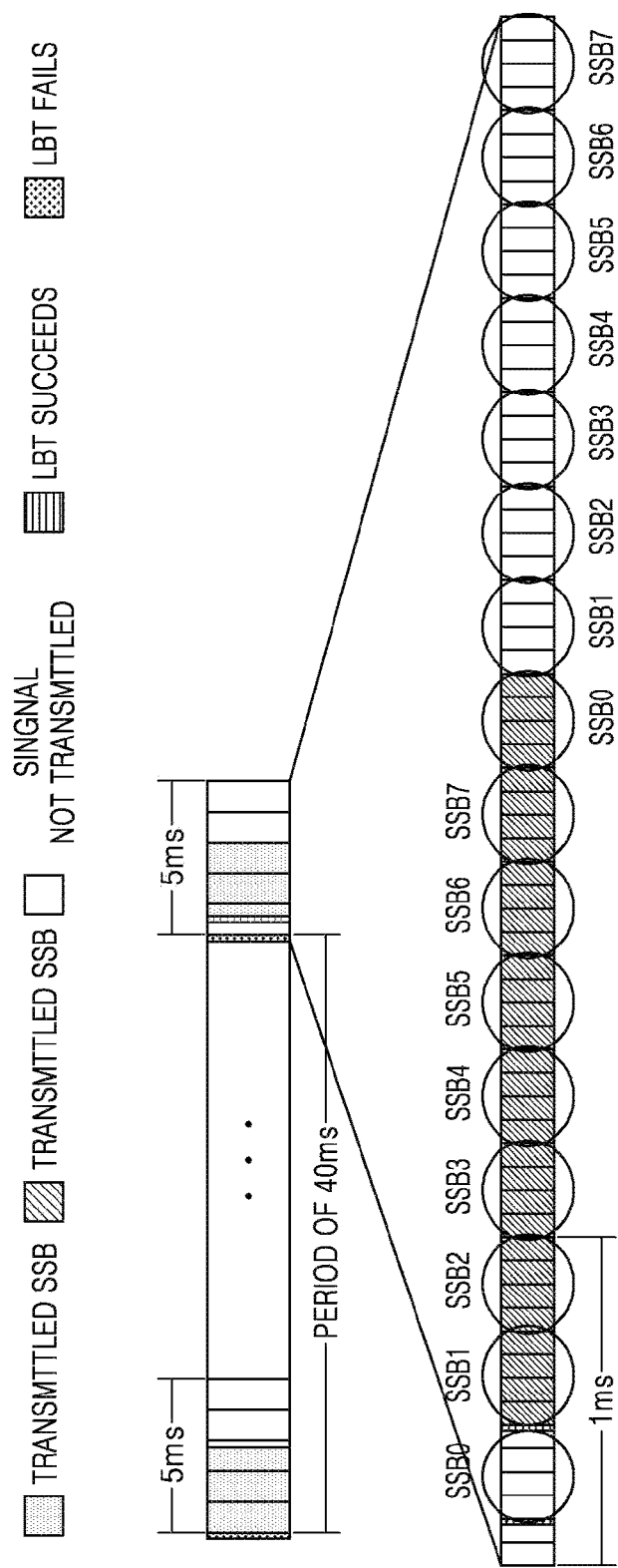
FIG. 12 is a schematic diagram of a thirteenth SSB transmission arrangement according to the present disclosure.

In the prior art, an SSB of the 5G NR contains 4 symbols, wherein the $1^{th}$ symbol is PSS, the $3^{th}$ symbol is SSS, and the $2^{th}$ and $4^{th}$ symbols are respectively PBCH and DMRS thereof. The respective SSBs are not arranged next to each other, but separated from each other, as shown in FIGS. 2-5, and FIGS. 8a-11b. In order to reduce the length-of-time T, the respective SSBs may be arranged next to each other (the present disclosure does not define the specific pattern of each signal in the SSB). As shown in FIG. 12, the length of one SSB set is shortened to 3 ms. If a system supports various arrangement patterns, the base station may notify, when configuring the measurement for the UE, the UE of which SSB pattern is used by the measured cell. For example, if the measured cell may act as only a secondary cell (Scell), the base station may transmit only PSS/SSS and PBCH with no system information transmitted, so respective SSBs each containing only SS and PBCH may be arranged next to each other. If the measured cell may act as a primary cell (Pcell), the base station needs to transmit the PSS/SSS/PBCH and the system information. Thus, it is relatively reasonable to transmit an SSB together with the corresponding RMSI. For example, an SSB of 4 symbols and RMSI of 2 symbols (i.e. 6 symbols) may be transmitted together, and respective SSBs may be arranged next to each other in units of 6 symbols. Alternatively, the SSB and the corresponding RMSI may be transmitted in a frequency division multiplexing mode, and respective SSBs and the corresponding RMSI may be arranged next to each other in the time dimension.

Another problem is that, if there are idle symbols between adjacent SSBs (for example, in the existing SSB arrangement patterns), the base station may need to perform the LBT again among the idle symbols. In order to avoid the LBT again, in implementation, the base station should transmit padding bits or transmit other downlink signal (for example, RMSI) to fill up the idle symbols between adjacent SSBs, with no gap left, within the continuous transmission time T after the LBT before the initial SSB succeeds.

The SSB arrangement patterns described above are applicable to any of the SSB transmission modes of the present disclosure.

In step 302, the UE receives the PBCH.

In step 302, the UE receives the PBCH transmitted together with the SS according to the SS received in step 301.

In step 303, the UE performs measurement according to the received SSB, and determines information of the cell to which the SSB belongs.

According to the received SS sequence, the UE determines the cell ID of the cell to which the SS belongs or determines the ID used for SS generation.

According to method (1) or (2) or (3) in step 301, the base station needs to perform transmission in the same beam direction for the same SSB index position in different SMTC windows or in different windows for transmitting the SSBs. According to the time positions of the received two SSBs, the UE may determine whether the two SSBs are at the same SSB index position and have the same SSB index or SSB logical index, thereby determining whether the QCL relationship is satisfied and the detection results may be combined. For method (2) in step 301, further, $SSB_i$ and $SSB_j$ where $$i \bmod \left\lceil \frac{L}{Le} \right\rceil = j \bmod \left\lceil \frac{L}{Le} \right\rceil \text{ (or } i \bmod Le = j \bmod Le)$$

have the same beam direction. According to the time positions of the received two SSBs, the UE may determine whether a difference between the indexes of the two SSBs is an integer multiple of $L_e$, thereby determining whether the QCL relationship is satisfied and the detection results may be combined. For example, assuming that the period of the SMTC window or the SSB transmission window is Tss, and that the length-of-time of one SSB set is X or the interval between two adjacent sets of SSBs is X, and the length-of-time of one SSB is Y or the interval between two adjacent SSBs is Y, then the UE may assume that two SSBs with time relationship satisfying m*Tss+n*X+l*Y are of QCL, wherein n=0, 1, ..., N−1, where N is the number of candidate positions of one SSB set in one SMTC window or one SSB transmission window; according to method (1) in step 301, l is the actual index of the SSB, and l=0, 1, ..., L−1, where L is the number of SSBs contained in one complete SSB set; or, according to method (3) in step 301, l is the logical index of the SSB, and l=0, 1, ..., $L_e$−1, where $L_e$ is the number of SSBs contained in one SSB set expected to be transmitted by the base station; m is an integer. Alternatively, according to method (2) in step 301, $SSB_i$ and $SSB_j$ where $$i \bmod \left\lceil \frac{L}{Le} \right\rceil = j \bmod \left\lceil \frac{L}{Le} \right\rceil \text{ (or } i \bmod Le = j \bmod Le)$$

have the same beam direction. If the UE cannot obtain information about $L_e$, the UE may assume that two SSBs with time relationship satisfying m*Tss+n*X+l*Y are of QCL, wherein X is a length-of-time of one SSB set or an interval between two adjacent sets of SSBs and X=1 ms. If the UE has already obtained information about $L_e$, X is an interval between two adjacent sets of SSBs with the same beam and X=0.5 ms.

It can be seen that, at least for method (1) in step 301, the UE may determine, with no PBCH received, which SSBs satisfy QCL relationship. This method satisfies the requirements for measurement only in granularity of a cell. That is, for the measurement only in granularity of a cell, the UE may perform only step 301 and step 303, and it is unnecessary to demodulate the PBCH in step 303. Otherwise, the UE needs to perform steps 301~303.

If the UE is required to determine the SSB index, for example, when the UE needs to accomplish measurement in granularity of a beam and reporting, the SSB index may be determined according to any of the following methods. The UE may report a measurement result of the SS and the SSB index of the SS.

(3.1) If the measured cell and the serving cell are quasi-synchronous (for example, time difference between the two cells is within the cyclic prefix (CP), or the time difference is less than half of a time interval between the PSSs of two adjacent SSBs, or the time difference is less than a pre-defined threshold), the UE may determine the SSB index corresponding to a detected SS according to the configured SS time position of the measured cell and the timing relationship of the detected SS with respect to the serving cell. For example, the serving cell may configure that the period of the SSB transmission window of the measured cell is 40 ms and the time offset is 0 subframe, and may configure to detect SSB1 and SSB2. Taking FIG. 8a for example, the UE may assume that the clock of the serving cell is substantially aligned with that of the measured cell. If a PSS is detected in the $9^{th}$ symbol within the $42^{nd}$ ms based on the timing of the serving cell, the corresponding SSB index may be determined as SSB1 since this PSS is within the position of SSB1 in the second candidate-position set within the window. If the UE detects a PSS in the $10^{th}$ symbol within the $42^{nd}$ ms, the UE may also determine the corresponding SSB index as SSB1 since it is assumed that time difference between the two cells does not exceed half of a time interval between the PSSs of two adjacent SSBs, that is, does not exceed 2 symbols.

(3.2) If the measured cell and the serving cell are asynchronous, but the serving cell can obtain the timing information of the measured cell, the serving cell may configure time auxiliary information when configuring measurement, so that the UE could determine the SSB index. The UE may determine the SSB index corresponding to a detected SS according to the configured SS time position of the measured cell, the timing relationship of the detected SS with respect to the serving cell, and the configured time auxiliary information. For example, the serving cell may configure that the period of the SSB transmission window of the measured cell is 40 ms and the time offset of the measured cell with respect to the serving cell is 1 subframe, and may configure to detect SSB1 and SSB2. Taking FIG. 8a for example, the UE may assume that the clock of the serving cell is substantially aligned with that of the measured cell. If a PSS is detected in the $9^{th}$ symbol within the $43^{rd}$ ms based on the timing of the serving cell, the corresponding SSB index may be determined as SSB1 since this PSS is within the position of SSB1 in the second candidate-position set within the window.

(3.3) If the serving cell cannot obtain the timing information of the measured cell, or the serving cell does not configure time auxiliary information for the UE, or the UE is in the initial access state, the UE may determine the SSB index from other signal transmitted together with the SS. For example, the SSB index may be carried by the DMRS of the PBCH, and may be used as a variable for determining an initial value of the DMRS sequence. Alternatively, the SSB index may be carried by the Master Information Block (MIB) of the PBCH, or by the DMRS of the RMSI, or by the RMSI. Alternatively, if it is configured that the channel state information-reference signal (CSI-RS) is transmitted together with the SSB, the SSB index may be carried by the time, frequency and code resources of the CSI-RS. Alternatively, the SSB index may be indicated by the above multiple other signals jointly. For example, if L=64, 6 bits are required to indicate the SSB index, wherein a part of bits may be carried by the DMRS and a part of bits may be carried by the PBCH or the RMSI.

If the UE needs to determine the time information of the cell to which the detected SSB belongs, the UE may determine the index of the slot and/or the index of the SF from other signal transmitted with the SS. The index indicating the SF may be carried by PBCH or RMSI. The index indicating the slot or subframe or an indication of whether the former half or the latter half of the SF may be carried by the DMRS of the PBCH, or by the DMRS of the RMSI, or by the CSI-RS, or by other reference signal, or by the PBCH, or by the RMSI. The index indicating the slot may be indicated in granularity of the time unit required for one SSB set. The slot or subframe information may be determined according to the predefined pattern of the SSB and the indicated position of one SSB set in the predefined pattern. The predefined pattern may be a pattern of one or more sets of SSB candidate positions using the start point of the former half or the latter half of the SF as the start point. For example, assuming that one SSB set cannot span the former half and the latter half of one SF, and assuming that one candidate-position set must accommodate one complete SSB set, the index of a slot or subframe in one SF may be indicated by $\log_2(2 \cdot \lfloor 5/X \rfloor)$ bits. Taking FIG. 8a for example, X=1 ms, so $\log_2 10=4$ bits are required for the indication. Assuming that a bit indication is 0110, it indicates that SSB1 detected by the UE is in the $7^{th}$ candidate position in one SF, that is, in the $2^{th}$ ms in 5 ms of the latter half of one SF. As another example, if positions of $X_1$ sets of SSBs are contained in half of one SF (as shown in FIG. 8a, positions of 5 sets of SSBs are contained in half of one SF), $\log_2(2 \cdot X_1) = \log_2 10 = 4$ bits may be used for the indication. As another example, taking FIG. 8b for example, X=0.5 ms, so $\log_2 20 = 5$ bits are required for the indication. Assuming that a bit indication is 1100, it indicates that SSB3 detected by the UE is in the $13^{th}$ candidate position in one SF, that is, in the $1.5^{th}$ ms in 5 ms of the latter half of one SF. Since the logical index of SSB3 is SSB1, the position of SSB3 corresponds to the $9^{th}$ to $12^{th}$ symbols in the $1.5^{th}$ ms. If one SSB set may span the former half and the latter half of one SF, the index of a slot or subframe in one SF may be indicated by $\log_2(10/X)$ bits. Since the position of each SSB in each SSB set is predefined and the position of each SSB set corresponds to one unique index of the slot or subframe, the UE can infer the index of a slot or subframe, where an SSB is, upon receiving the SSB and an indication of which set of SSB positions the SSB is in. The present disclosure does not define how the base station specifically indicates an SSB set to which an SSB belongs. For example, the base station may indicate, by a separate bit field or in a different form, whether an SSB is in the former half or the latter half of one SF and which SSB set the SSB belongs to in the half of the SF. Alternatively, the base station may indicate, by a bit field, whether an SSB is in the former half or the latter half of one SF and which SSB set the SSB belongs to in the half of the SF. In this case, the start point of the predefined pattern is a start point of the former half of a specific SF.

According to method (4) or (5) or (6) in step 301, the base station needs to perform transmission in the same beam direction for the same SSB index position in different SMTC windows or in different windows for transmitting the SSBs. For method (5) in step 301, further, $SSB_i$ and $SSB_j$ where $$i \bmod \left\lfloor \frac{L}{Le} \right\rfloor = j \bmod \left\lfloor \frac{L}{Le} \right\rfloor \text{ (or } i \bmod Le = j \bmod Le)$$

have the same beam direction. According to the time positions of the received two SSBs, the UE may determine whether the two SSBs have the same SSB index or the same SSB logical index, or whether the SSB indexes satisfy $$i \bmod \left\lfloor \frac{L}{Le} \right\rfloor = j \bmod \left\lfloor \frac{L}{Le} \right\rfloor \text{ (or } i \bmod Le = j \bmod Le),$$

thereby determining whether the QCL relationship is satisfied and the detection results may be combined. As in method (1) or (2) or (3), the UE may assume that two SSBs with time relationship satisfying m*Tss+n*X+l*Y are of QCL. If the UE is not allowed to combine multiple detection results, it may not be defined that the base station should perform transmission in the same beam direction for the same SSB index position. For the measurement only in granularity of a cell, the UE may perform only step 301 and step 303, and it is unnecessary to demodulate the PBCH in step 303. Otherwise, the UE needs to perform steps 301~303.

If the UE is required to determine the SSB index, for example, when the UE needs to accomplish measurement in granularity of a beam and reporting, the SSB index may be determined according to any of (3.1)~(3.3).

If the UE needs to determine the time information of the cell to which the detected SSB belongs, the UE may determine the index of the slot and/or the index of the SF from other signal transmitted with the SS. As in method (1) or (2) or (3), the index indicating the slot may be indicated in granularity of the time unit required for one SSB set. The slot or subframe information may be determined according to the predefined pattern of the SSB and the indicated position of one SSB set in the predefined pattern. Taking FIG. 9a for example, assuming that one SSB set cannot span the former half and the latter half of one SF, and assuming that one candidate-position set may accommodate only a part of one SSB set, then the index of a slot or subframe in one SF may be indicated by $\log_2(2 \cdot \lceil 5/X \rceil) = 2$ bits, wherein the length-of-time of one complete SSB set is X=4 ms. If a bit indication is 0000, it indicates that SSB1 detected by the UE is in the $1^{th}$ candidate position in one SF, that is, in the $1^{th}$ ms in 5 ms of the former half of one SF. As another example, if positions of $X_1$ sets of SSBs are contained in half of one SF (as shown in FIG. 9a, positions of 2 sets of SSBs are contained in half of one SF), $\log_2(2 \cdot X_1) = \log_2 4 = 2$ bits may be used for the indication. Taking FIG. 9b for example, assuming that one SSB set cannot span the former half and the latter half of one SF, and assuming that one candidate-position set may accommodate only a part of one SSB set, then the index of a slot or subframe in one SF may be indicated by $\log_2(2 \cdot \lceil 5/X \rceil) = 4$ bits, wherein the length-of-time of one complete SSB set is X=1 ms. Since the position of each SSB in each SSB set is predefined and the position of each SSB set corresponds to one unique index of the slot or subframe, the UE can infer the corresponding index of a slot or subframe upon receiving an SSB and an indication of which set of SSB positions the SSB is in.

According to method (7) or (8) in step 301, the base station needs to perform transmission in the same beam direction for the SSBs with the same SSB index in different SMTC windows or in different windows for transmitting the SSBs. Differing from methods (1) (4), in method (7) or (8), since the SSB index positions are not in fixed one-to-one correspondence with the SSB indexes, the UE cannot determine the SSB index according to the time position (i.e. the SSB index position) of the detected SSB, and cannot determine whether two SSBs may be combined according to the time position of the detected SSB. The base station must explicitly indicate the SSB index by other information. If the UE is not allowed to combine multiple detection results, it may not be defined that the base station should transmit SSBs with the same SSB index in the same beam direction.

For the measurement only in granularity of a cell and based on the result of once detection, the UE may perform only step 301 and step 303, and it is unnecessary to demodulate the PBCH in step 303. Otherwise, the UE needs to perform steps 301~303.

The UE may determine the SSB index from other signal transmitted together with the SS. For example, the SSB index may be carried by the DMRS of the PBCH, and may be used as a variable for determining an initial value of the DMRS sequence. Alternatively, the SSB index may be carried by the MIB of the PBCH, or by the DMRS of the RMSI, or by the RMSI. Alternatively, if it is configured that the CSI-RS is transmitted together with the SSB, the SSB index may be carried by the time, frequency and code resources of the CSI-RS. Alternatively, the SSB index may be indicated by the above multiple other signals jointly. For example, if L=64, 6 bits are required to indicate the SSB index, wherein a part of bits may be carried by the DMRS and a part of bits may be carried by the PBCH or the RMSI.

If the UE needs to determine the time information of the cell to which the detected SSB belongs, the UE may determine the index of the slot and/or the index of the SF from other signal transmitted with the SS. The index indicating the slot may be indicated in granularity of the time unit required for one SSB. The slot or subframe information may be determined according to the predefined pattern of the SSB and the indicated position of one SSB in the predefined pattern. Taking FIG. 10*a* or FIG. 10*b* for example, assuming that one SSB set cannot span the former half and the latter half of one SF and that there are candidate positions of 10 SSBs in half of the SF, then the index of a slot or subframe in one SF may be indicated by $\log_2(2 \cdot 10)$=bits. If a bit indication is 01100, SSBx1 detected by the UE is in the $13^{th}$ candidate position in one SF, that is, in the first SSB candidate position in the $2^{th}$ ms in 5 ms of the latter half of one SF. As another example, if positions of $X_1$ SSBs are contained in half of one SF (as shown in FIG. 10*a*, positions of 10 SSBs are contained in half of one SF), $\log_2(2 \cdot X_1) = \log_2 20 = 5$ bits may be used for the indication. Since the position of each SSB corresponds to one unique index of the slot or subframe, the UE can infer the corresponding index of a slot or subframe upon receiving an SSB and an indication of which SSB position the SSB is in.

According to method (9) in step 301, whether the SSBs are of QCL or not, the SSB index, and the time information of the cell may be determined according to method (4) or (7). According to method (10) in step 301, whether the SSBs are of QCL or not, the SSB index, and the time information of the cell may be determined according to method (5). According to method (11) in step 301, whether the SSBs are of QCL or not, the SSB index, and the time information of the cell may be determined according to method (6) or (8).

In the above-described methods, when the SSB index and the time information, such as the SF index, the slot index, etc., are indicated by the PBCH and/or the DMRS of the PBCH, the indication manner is determined according to the maximum number L of the SSBs in one SSB set, regardless of whether the UE has acquired information about $L_e$. For example, in a frequency band of 2 GHz, if a subcarrier interval is 30 KHz, L=8. Then, the SSB index and the time information are indicated in a manner corresponding to L=8, regardless of the value of the number $L_e$ of SSBs expected to be transmitted by the base station. For example, the 3-bit LSB of the SSB index information may be indicated by the DMRS, and the 1-bit information indicating whether the former half or the latter half of one SF may be carried by the PBCH. Similarly, when the RMSI is used to indicate which of the L SSBs are the $L_e$ SSBs expected to be transmitted by the base station, the length of the indication information is also determined according to L, for example, indication by a bitmap of a length L.

Based on the method of step 101 described above, movement of the SSB in the time window (the SMTC window or the SSB transmission window) according to a predefined rule may be supported. In the time window, if the base station also transmitted other signals, the moved SSB may have an impact on the transmission and reception of the other signals. For example, if a periodic signal or a semi-persistant signal should be transmitted in a specific slot of the time window according to configuration parameters, when the SSB is to be transmitted also in this slot, the signal may be in collision (for example, collision in time/frequency/code resources) with the SSB; or, if the base station transmits a downlink data signal such as PDSCH in the time window, it is necessary to determine how to perform rate matching for the PDSCH so that the PDSCH does not overlap with the SSB; or the signal may be in collision with the SSB in the transmission direction, for example, the transmission direction of the signal is different from that of the SSB, but the base station can transmit signals only in one direction in the same time unit. Generally, when configuring a periodic signal or a semi-persistant signal, the base station may also configure the SSB index that satisfies the QCL relationship with the signal, so as to indicate the transmission/reception direction of the signal. A collision may occur when the SSB index of the SSB to be transmitted by the base station is different from the SSB index that satisfies the QCL relationship with the signal.

For the PDSCH transmitted in the SMTC window or the SSB transmission window, such as the RMSI or a normal PDSCH, if a part of resources thereof do not overlap with the SSB, which may be transmitted, in the time or frequency domain resources, the mapping of this part of resources may ignore the impact of the SSB; otherwise, the time-frequency resources, on which the UE cannot receive any downlink signal or downlink physical channel except the SSB, may be determined according to at least one of the following methods. For example, when the PDSCH in the SMTC is to be received, it is necessary to determine the position of these resources avoided by the PDSCH and to determine the rate matching or puncturing information for the PDSCH. As another example, when other periodic reference signal or semi-persistant reference signal in the SMTC is to be received, it is necessary to determine the position of the resources avoided by the reference signal, so as to correctly receive the reference signal. The specific methods will be described below by taking the reception of the PDSCH for example, but also applicable to the reception of other reference signals or physical channels (e.g., PDCCH) in the SMTC.

Preferably, in order to ensure the performance of the PDSCH of the RMSI, the base station always avoids the resources on which the SSB is so as to allocate resources for the PDSCH.

(a) The base station indicates, through control signaling of a cell common physical downlink control channel (C-PDCCH) or a Group-specific PDCCH in each slot or each consecutive transmission burst, resource occupied by the SSBs contained in the current slot or the slot in the transmission burst. According to the indicated resource occupied by the SSBs, the UE determines how the base station performs rate matching or puncturing for the PDSCH, and performs resource mapping, thereby avoiding the indicated resource occupied by the SSBs. The control signaling may be transmitted at the start of each slot or each transmission burst. The control signaling may contain 1 bit indicating whether the PDSCH needs to avoid all the SSB candidate positions in this slot or this transmission burst. As shown in FIG. 2, there are 2 SSB candidate positions in one slot, and the 1 bit may indicate whether both of the 2 candidate positions need to be avoided or not. Alternatively, the control signaling may contain K bits indicating which of K SSB candidate positions in this slot or this transmission burst the PDSCH needs to avoid, wherein K represents the number of SSB candidate positions in one slot or transmission burst, and the number of SSB candidate positions in one transmission burst is determined according to the maximum length-of-time of the transmission burst. As shown in FIG. 2, there are 2 SSB candidate positions in one slot, and 2 bits may be used to indicate which of the 2 candidate positions to be avoided. Alternatively, the control signaling may contain $\log 2(K)$ bits indicating that the PDSCH needs to avoid the $k^{th}$ SSB candidate position through the $K^{th}$ SSB candidate position in this slot or transmission burst, where K represents the number of SSB candidate positions in one slot or transmission burst, and wherein it is assumed that, once the base station occupies a channel to start transmission of SSBs from the $k^{th}$ SSB candidate position, the SSBs may be consecutively transmitted until all the SSBs are transmitted.

(b) The base station indicates, through scheduling control signaling transmitted by the PDSCH, the resource occupied by the SSBs contained in the slot where the PDSCH is. If the base station has not configured the resource for the rate matching for the UE before the RRC connection establishment, the control signaling transmitted when scheduling the PDSCH may contain 1 bit indicating whether the PDSCH needs to avoid all the SSB candidate positions in the PDSCH. Alternatively, the control signaling may contain K bits indicating which of K SSB candidate positions in the PDSCH the PDSCH needs to avoid, wherein K represents the number of SSB candidate positions in one slot. Alternatively, the control signaling may contain $\log_2(K)$ bits indicating that the PDSCH needs to avoid the $k^{th}$ SSB candidate position through the $K^{th}$ SSB candidate position in the PDSCH, where K represents the number of SSB candidate positions in one slot, and wherein it is assumed that, once the base station occupies a channel to start transmission of SSBs from the $k^{th}$ SSB candidate position, the SSBs may be consecutively transmitted until all the SSBs are transmitted.

(c) The UE assumes that, when the base station transmits the PDSCH, the PDSCH cannot be mapped to any one of the SSB candidate positions in the SMTC window or the SSB transmission window.

It should be noted that that the range of the any one of the SSB candidate positions is determined according to the maximum number L of SSBs that one SSB set may contain. The number of SSBs actually expected to be transmitted by the base station is $L_d$; L, and the number of SSBs actually transmitted by the base station may be smaller than $L_d$ due to the LBT.

In some scenarios, for example, if the UE does not know the definite relationship between the positions of SSBs actually transmitted by the base station and the positions of SSBs expected to be transmitted by the base station, as in method (2) or (5) in step 301, although the number of SSBs transmitted in each transmission window is identical, the SSB indexes may be different. Thus, the UE cannot determine the SSB indexes of SSBs expected to be transmitted by the base station according to the previously acquired $L_e$ information, so that the base station may only determine, according to L, that the PDSCH needs to avoid any one of the SSB candidate positions.

In some scenarios, the UE needs to receive the PDSCH before $L_e$ information is acquired. In this case, the base station may also only determine, according to L, that the PDSCH needs to avoid any one of the SSB candidate positions.

For determining SSB candidate positions, in one implementation, if the base station configured the SMTC for the UE, the UE may regard all possible SSB positions in the SMTC as SSB candidate positions. As shown in FIG. 8a, according to L=4, there are 5 sets of SSB candidate positions in 5 ms in the SMTC window, and each SSB set contains 4 SSBs. These 20 SSB positions are all SSB candidate positions, and the PDSCH cannot be mapped to any of the 20 SSB candidate positions.

In another implementation, all possible SSB positions in the SSB transmission window in a predefined length-of-time (for example, 5 ms) from the start point of the former half or the latter half of one SF may be regarded as SSB candidate positions. If the start point of the SMTC is not at the start point of the former half or the latter half of one SF, only positions of the SSBs in the SMTC corresponding to the SSBs in the SSB transmission window may be regarded as SSB candidate positions, and the PDSCH cannot be mapped thereto. For example, in FIG. 8a, assuming that the start point of the SMTC window is subframe 13, i.e., the SMTC window is from the $13^{th}$ ms to the $17^{th}$ ms, and that, since the UE has ever received or now receives the SSB/PBCH and RMSI, it is determined that the start point of the SSB transmission window is the start point of the latter half of one SF and the window has a length of 5 ms, then 3 sets of SSB positions from the $15^{th}$ ms to the $17^{th}$ ms (0~$9^{th}$ ms is the first SF, and $10^{th}$ ms~$19^{th}$ ms is the second SF, wherein $10^{th}$ ms~$14^{th}$ ms is the former half of the second SF, and $15^{th}$ ms~$19^{th}$ ms is the latter half of the second SF) in the SMTC, that is, the $3^{rd}$, $4^{th}$, and $5^{th}$ sets of SSB positions in the SMTC, may be regarded as SSB candidate positions, and the PDSCH cannot be mapped to any of the 12 SSB candidate positions. The $1^{th}$ and $2^{nd}$ sets of SSB positions in the SMTC window are not SSB candidate positions, and the PDSCH may be mapped to these positions.

(d) The UE assumes that, when the base station transmits the PDSCH, the PDSCH cannot be mapped to any SSB candidate position where an SSB may be transmitted, which is indicated by the system information or configured by the base station, in the SMTC window or the SSB transmission window. Differing from method (c), in this method, the range of the any SSB candidate position is further determined according to the number $L_e$ of SSBs expected to be transmitted by the base station. Information about $L_e$ may be indicated by, for example, MIB or RMSI or RRC signaling. Therefore, this method is more applicable to reception of the PDSCH in the case where the positions of SSBs actually transmitted by the base station is a subset of the positions of SSBs expected to be transmitted by the base station and after the UE has already received the PDSCH containing the $L_e$ information. In contrast, method (c) is more applicable to reception of the PDSCH in the case where the UE does not know the relationship between the positions of SSBs actually transmitted by the base station and the positions of SSBs expected to be transmitted by the base station or before the UE acquires the $L_e$ information.

The base station may indicate the positions of one SSB set through RRC signaling, and determine all SSB candidate positions according to the positions of the one SSB set. For example, the SSB transmission window may be determined according to information about an SF/half of an SF indicated by the PBCH and/or system information, and information about a period of an SSB etc. indicated by the system information. Positions of which SSBs of each SSB set in the SSB transmission window may be SSB candidate position may be determined according to RRC signaling of the base station, and the RRC signaling is the same for each SSB set. According to method (4) in step 301, taking FIG. 8a for example, if L=4, $L_e$=2, and SSB1 and SSB3 are expected to be transmitted by the base station, then any candidate position of SSB1 and SSB3, excluding those of SSB0 and SSB2, is an SSB candidate position, i.e. there are 10 candidate positions that the PDSCH cannot be mapped to. As another example, according to method (6) in step 301, taking FIG. 8b for example, if L=4, $L_e$=2, and SSB1 and SSB3 are expected to be transmitted by the base station, since all the SSB candidate positions are candidate positions of the two SSBs, the PDSCH cannot be mapped to the 20 candidate positions. Method (5) in step 301 is the same as method (6) in step 301.

(e) The UE assumes that, when the base station transmits the PDSCH, if the resources allocated for the PDSCH overlap with the resources of the specific SSB candidate positions, the PDSCH cannot be mapped to the specific SSB candidate positions. Moreover, the resources allocated for the PDSCH cannot overlap with resources of other SSB positions.

The specific SSB candidate positions may be the first set of SSB positions in the predefined pattern, for example, one set of SSB positions starting from the start point of the former half and/or the latter half of one SF. As shown in FIG. 8a, according to L=4, there are 5 sets of SSB candidate positions in 5 ms in the SMTC window, and each SSB set contains 4 SSBs. Assuming that the start point of the SMTC window is subframe 13, i.e., the SMTC window is from the $13^{th}$ ms to the $17^{th}$ ms, then the specific SSB candidate positions may be the first set of SSB positions starting from the start point of the latter half of one SF, that is, one set of SSB positions starting from the $15^{th}$ ms (0~$9^{th}$ ms is the first SF, and $10^{th}$ ms~$19^{th}$ ms is the second SF, wherein $10^{th}$ ms~$14^{th}$ ms is the former half of the second SF, and $15^{th}$ ms $19^{th}$ ms is the latter half of the second SF), that is the $3^{th}$ set of SSB positions in the SMTC window. The $1^{th}$, $2^{th}$ and $5^{th}$ sets of SSB positions in the SMTC window are other SSB candidate positions. Preferably, if the base station indicates, by the system information, which SSBs of one SSB set are expected to be transmitted, the positions of these SSBs determined by the above method are the specific SSB candidate positions.

(f) The UE assumes that, when the base station transmits the PDCCH, the PDCCH cannot be mapped to any one of the SSB candidate positions in the SMTC window or the SSB transmission window. According to the PDCCH transmitted by the base station, the UE may determine resource occupied by the SSBs contained in the slot where the PDSCH is. The PDCCH may be determined according to method (a) or (b).

Preferably, in the above methods, the resource to which the PDSCH cannot be mapped is in granularity of the RB, that is, the PDSCH cannot be mapped to the RB where the SSB resource of the OFDM symbol containing the SSB resource is.

The indication of the resource occupied by the SSBs may be simplified as indicating whether it is necessary to avoid the SSBs in the SSB candidate positions in the slot. The specific symbols and frequency domain resource occupied by the SSBs may be predefined by a standard, or broadcast in the PBCH, or indicated in the system information, or configured by RRC signaling.

For a periodic or semi-persistant signal transmitted in the SMTC window or the SSB transmission window, such as CSI-RS for CSI measurement, or CSI-RS for beam management, if the periodic or semi-persistant signal is in collision with the transmitted SSB in the time and frequency domain resources, the periodic or semi-persistant signal will not be transmitted, or the collision resources may be determined according to the methods described above, and the periodic or semi-persistant signal will not be transmitted only on the collision resources while transmitting the signal normally on the collision-free resources. If the periodic or semi-persistant signal is in collision with the transmitted SSB not in the time or frequency domain resources, but in the transmission beam directions collisions, the periodic or semi-persistant signal will not be transmitted, or will be transmitted in the direction of transmitting the SSB.

Among various periodic signals (excluding the SSB), the Beam-Failure-Detection-RS or the reference signal for determining a candidate beam in radio link quality measurement, or the reference signal for radio link monitoring, or the reference signal for RRM measurement has a greater impact on the performance of the entire system than other periodic signals. In order to ensure transmission of these special periodic signals as far as possible, the transmission on multiple candidate positions in a predefined window, similar to the transmission of the SSB, may be supported. For example, a transmission window may also be configured for these special periodic signals, and candidate positions in the transmission window may be determined in granularity of a slot. As another example, if these special periodic signals fall in the SMTC window or the SSB transmission window, the periodic signal may be moved together with the SSB having the same transmission beam direction. The same transmission beam direction means that the index of the SSB satisfying the QCL relationship with the periodic signal is the same as the index of the SSB to be transmitted. For example, CSI-RS A for RLM is configured to be transmitted on the $1^{th}$ and the $2^{nd}$ symbols in the first slot of each 40 ms as a period and correspond to SSB0; and CSI-RS B is configured to be transmitted on the $8^{th}$ and the $9^{th}$ symbols in the fourth slot of each 40 ms as a period and correspond to SSB7. As shown in FIG. 9a, assuming that one SSB may occupy 7 symbols in half a slot, wherein 4 symbols are PSS/SSS/PBCH and the remaining 3 symbols may be used to transmit padding bits, then, if SSB0 cannot be transmitted in the $1^{th}$ candidate position in the SMTC window but may be transmitted in the $2^{nd}$ candidate position in the SMTC window, CSI-RS A may also be transmitted together with SSB0. Accordingly, if movement of such special CSI-RS with the SSB is supported, the UE is also required to determine, when receiving the PDSCH, whether the PDSCH may be mapped to these resources. The same methods as the above methods (a) (d) may be used except that it is necessary to avoid the resources of CSI-RS in addition to those of the SSBs.

As described above, after acquiring the time information of the cell to which the detected SSB belongs, the UE may determine the resources for the random access procedure. In the prior art, in the licensed frequency band, according to the received one or more SSBs, according to the received PRACH resource configuration information (e.g., the PRACH resources indicated by the system information or dedicated RRC signaling), and according to a predefined rule for associating the SSB with the PRACH occasion, the UE determines the time and/or frequency domain and/or code word resources of respective PRACH occasions corresponding to the SSBs. One PRACH occasion may correspond to N SSBs, where N may be a positive number greater than 1 or less than 1. In the unlicensed frequency band, it is uncertain whether and where to transmit each SSB in each SMTC. In order to avoid the impact of the uncertainty of the SSB on the PRACH resource determination, the SSB for determining the PRACH resources may be determined according to a predefined rule. For example, the position of a PRACH occasion corresponding to the SSBs may be determined according to a period of the SSBs expected to be transmitted by the base station, the positions of the SSBs and the number $L_e$ of SSBs of one SSB set expected to be transmitted by the base station (e.g., determined according to the parameters "ssb-PeriodicityServingCell" and "ssb-PositionsInBurst" in the RMSI) as well as the PRACH configuration, regardless of whether these SSBs are not transmitted due to the LBT or whether they are moved in time, i.e. not according to the actual transmission situation of these SSBs. That is, the position of the PRACH occasion may be determined according to the method for determining the PRACH occasion in the licensed frequency band in the prior art, such as the method described in 8.1 of TS 38.213. Alternatively, the position of a PRACH occasion corresponding to the SSBs may be determined according to a period of the SSBs expected to be transmitted by the base station, the first set of SSB candidate positions in the SSB transmission window, the number $L_e$ of SSBs of one SSB set expected to be transmitted by the base station, and the SSB indexes. The base station may notify the above information through the system information. For example, the base station may notify, in SIB1, the expected SSB period, which SSBs are contained in the expected SSB set, the SSB indexes, and the SSB candidate position indexes. Then, the UE may determine the first set of SSB candidate positions in the SSB transmission window, the expected SSB period, and which SSBs are contained in the expected SSB set, thereby determining the PRACH occasions corresponding to these expected SSBs. For method (2) or (5) in step 301, $SSB_i$ and $SSB_j$ where $$i \mod \left\lceil \frac{L}{Le} \right\rceil = j \mod \left\lceil \frac{L}{Le} \right\rceil \text{ (or } i \mod Le = j \mod Le\text{)}$$

correspond to the same PRACH resource. For example, assuming that L=8, $L_e$=2, and the base station indicates SSB0 and SSB1 expected to be transmitted. The base station transmitted SSB5 and SSB6 in the first SMTC, and transmitted SSB0 and SSB1 in the second SMTC, wherein SSB5 and SSB1 correspond to the same PRACH resource, and SSB0 and SSB6 correspond to the same PRACH resource.

In another implementation, the position of a PRACH occasion corresponding to the SSBs may be determined according to a period of the SSBs expected to be transmitted by the base station, the number $L_e$ of SSBs of one SSB set expected to be transmitted by the base station, and the positions of the SSBs actually transmitted by the base station according to the LBT result.

Before transmitting the PRACH, the UE needs to determine not only the PRACH occasion but also the valid PRACH occasion available for transmission of the PRACH. If a PRACH occasion belongs to an uplink symbol region (for example, an uplink symbol region configured by the system information or RRC signaling, or an uplink symbol region indicated by the PDCCH), the PRACH occasion is valid. Alternatively, if in a PRACH slot there is no SSB candidate position after a PRACH occasion, and at least $N_{gap}$ symbols exist between the PRACH occasion and the previous downlink symbol or the previous SSB candidate position, the PRACH occasion is valid. The SSB candidate position may be determined according to L, or the SSB candidate position may be determined according to $L_e$. For example, the SSB candidate positions may be determined according to $L_e$, that is, the SSB candidate positions may be determined according to which SSBs of one SSB set, indicated by the base station, expected to be transmitted by the base station. For example, assuming that the SSB transmission window is from the $5^{th}$ ms to the $9^{th}$ ms, as shown in FIG. 8b, L=4, $L_e$=2, SSB1 and SSB3 are expected to be transmitted by the base station, there are 5 sets of SSB candidate positions in the SSB transmission window, and each set of SSB candidate positions contains candidate positions for SSB1 and SSB3. If a PRACH occasion is in the first 2 symbols of the $2^{nd}$ slot of $7^{th}$ ms, although the base station transmitted one SSB set only in the first slot of the $7^{th}$ ms and did not transmit any SSB in the $2^{nd}$ slot of 7 ms, the PRACH occasion in PRACH slot in $2^{nd}$ slot of $7^{th}$ ms is invalid since candidate positions for SSB1 and SSB3 exist in $2^{nd}$ slot of $7^{th}$ ms and is after the PRACH occasion.

Figure 13:
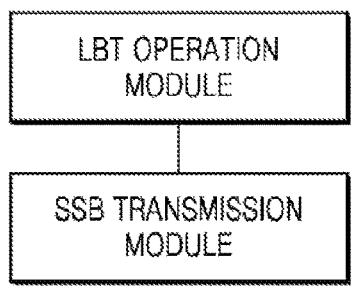
FIG. 13 is a block diagram of a base station equipment for transmitting a synchronization signal according to the present disclosure.

Referring to FIG. 13, the base station equipment for transmitting a synchronization signal according to the present disclosure may comprise:

LBT operation module configured to perform an LBT operation in a pre-defined window;

SSB transmission module configured to transmit an SSB in the window if the LBT operation succeeds, wherein the SSB comprises the SS, or the SSB comprises the SS and a PBCH.

The operating processes of the LBT operation module and the SSB transmission module respectively correspond to steps 101 and 102 of the method for transmitting a synchronization signal according to the present disclosure, and will not be described herein again.

Figure 14:
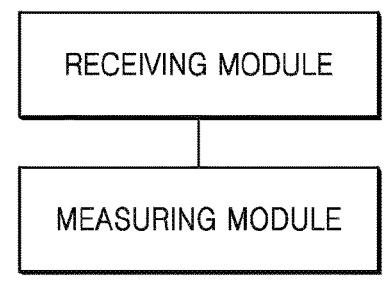
FIG. 14 is a block diagram of a user equipment for receiving a synchronization signal according to the present disclosure.

Referring to FIG. 14, the UE for receiving a synchronization signal according to the present disclosure may comprise:

receiving module configured to receive an SSB in a pre-defined window, wherein the SSB comprises an SS, or the SSB comprises the SS and a PBCH;

measuring module configured to perform channel measurement and/or cell detection based on the received SSB.

The operating processes of the receiving module and the measuring module respectively correspond to steps 201 and 202 of the method for receiving a synchronization signal according to the present disclosure, and will not be described herein again.

From the above detailed description of the present disclosure, it can be seen that, compared with the prior art, the present disclosure may achieve at least the following advantageous technical effects:

1. The efficiency of data transmission is significantly improved and the performance of the cell measurement is improved by relaxing the time when the base station implements the LBT, that is, allowing the base station to implement the LBT in the pre-defined window and transmit the SSB after the LBT succeeds;

2. Multiple methods for transmitting the SSBs in the pre-defined window are provided, so that the time when the SSBs are transmitted may be flexibly configured and the SSBs may be transmitted anytime after the LBT is completed, thereby increasing the probability that the UE successfully receives the SSBs and further improving the access performance for the system;

3. The correspondence between the SSB index and the time domain position is set in the method for transmitting the SSBs, so that the UE may combine the SSB detection results according to the correspondence, thereby improving the efficiency of reception;

4. The provided scheme for transmitting and detecting a synchronization signal has a simple process without a complicated signaling transfer process, which reduces the complexity of implementation of the transmitting device and the receiving device;

5. SSB resource position information is transmitted from the base station to the UE or is specified by a standard, so that the UE may avoid, according to the SSB resource position, an impact on reception of other downlink signals or downlink channels in the pre-defined window, which improves the efficiency of receiving data.

Figure 15:
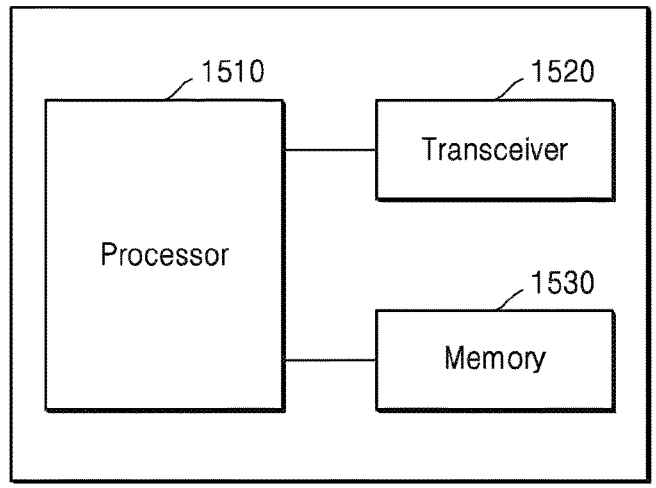
FIG. 15 is a block diagram illustrating the structure of a user equipment according to another embodiment of the present disclosure.

FIG. 15 is a block diagram illustrating the structure of a user equipment according to another embodiment of the present disclosure.

Referring to the FIG. 15, the user equipment 1500 may include a processor 1510, a transceiver 1520 and a memory 1530. However, all of the illustrated components are not essential. The user equipment 1500 may be implemented by more or less components than those illustrated in FIG. 15. In addition, the processor 1510 and the transceiver 1520 and the memory 1530 may be implemented as a single chip according to another embodiment. Furthermore, at least one component of the user equipment 1500 may correspond to at least one component of FIG. 14.

The aforementioned components will now be described in detail.

The processor 1510 may include one or more processors or other processing devices that control the proposed function, process, and/or method. Operation of the user equipment 1500 may be implemented by the processor 1510.

The processor 1510 may sense each configured resource pool and/or each group of resources to obtain a result of sensing, the result of sensing containing a set of remaining candidate single TU resources of each resource pool. The processor 1510 may select, from the set of remaining candidate single TU resources of each resource pool and/or each group of resources, one candidate single TU resource as a transmission resource.

The transceiver 1520 may include a RF transmitter for up-converting and amplifying a transmitted signal, and a RF receiver for down-converting a frequency of a received signal. However, according to another embodiment, the transceiver 1520 may be implemented by more or less components than those illustrated in components.

The transceiver 1520 may be connected to the processor 1510 and transmit and/or receive a signal. The signal may include control information and data. In addition, the transceiver 1520 may receive the signal through a wireless channel and output the signal to the processor 1510. The transceiver 1520 may transmit a signal output from the processor 1510 through the wireless channel.

The memory 1530 may store the control information or the data included in a signal obtained by the device 1500. The memory 1530 may be connected to the processor 1510 and store at least one instruction or a protocol or a parameter for the proposed function, process, and/or method. The memory 1530 may include read-only memory (ROM) and/or random access memory (RAM) and/or hard disk and/or CD-ROM and/or DVD and/or other storage devices.

Figure 16:
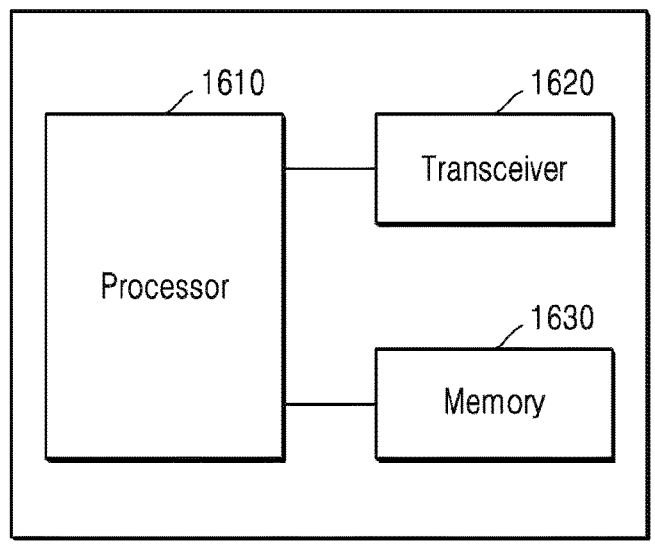
FIG. 16 is a block diagram illustrating the structure of a base station according to another embodiment of the present disclosure.

FIG. 16 is a block diagram illustrating the structure of a base station according to another embodiment of the present disclosure. Furthermore, at least one component of the base station 1600 may correspond to at least one component of FIG. 13.

Referring to the FIG. 16, the base station 1600 may include a processor 1610, a transceiver 1620 and a memory 1630. However, all of the illustrated components are not essential. The device 1600 may be implemented by more or less components than those illustrated in FIG. 16. In addition, the processor 1610 and the transceiver 1620 and the memory 1630 may be implemented as a single chip according to another embodiment.

The aforementioned components will now be described in detail.

The processor 1610 may include one or more processors or other processing devices that control the proposed function, process, and/or method. Operation of the device 1600 may be implemented by the processor 1610.

The processor 1610 may determine the locations of transmission resources and reception resources.

The transceiver 1620 may include a RF transmitter for up-converting and amplifying a transmitted signal, and a RF receiver for down-converting a frequency of a received signal. However, according to another embodiment, the transceiver 1620 may be implemented by more or less components than those illustrated in components.

The transceiver 1620 may be connected to the processor 1610 and transmit and/or receive a signal. The signal may include control information and data. In addition, the transceiver 1620 may receive the signal through a wireless channel and output the signal to the processor 1610. The transceiver 1620 may transmit a signal output from the processor 1610 through the wireless channel.

The memory 1630 may store the control information or the data included in a signal obtained by the device 1600. The memory 1630 may be connected to the processor 1610 and store at least one instruction or a protocol or a parameter for the proposed function, process, and/or method. The memory 1630 may include read-only memory (ROM) and/or random access memory (RAM) and/or hard disk and/or CD-ROM and/or DVD and/or other storage devices.

It should be understood by those skilled in the art that the present disclosure involves apparatuses for performing one or more of operations as described in the present disclosure. Those apparatuses may be specially designed and manufactured as intended, or may include well known apparatuses in a general-purpose computer. Those apparatuses have computer programs stored therein, which are selectively activated or reconstructed. Such computer programs may be stored in device (such as computer) readable media or in any type of media suitable for storing electronic instructions and respectively coupled to a bus, the computer readable media include but are not limited to any type of disks (including floppy disks, hard disks, optical disks, CD-ROM and magneto-optical disks), ROM (Read-Only Memory), RAM (Random Access Memory), EPROM (Erasable Programmable Read-Only Memory), EEPROM (Electrically Erasable Programmable Read-Only Memory), flash memories, magnetic cards or optical line cards. That is, readable media include any media storing or transmitting information in a device (for example, computer) readable form.

It should be understood by those skilled in the art that computer program instructions may be used to realize each block in structure diagrams and/or block diagrams and/or flowcharts as well as a combination of blocks in the structure diagrams and/or block diagrams and/or flowcharts. It should be understood by those skilled in the art that these computer program instructions may be provided to general purpose computers, special purpose computers or other processors of programmable data processing means to be implemented, so that solutions designated in a block or blocks of the structure diagrams and/or block diagrams and/or flow diagrams are performed by computers or other processors of programmable data processing means.

It should be understood by those skilled in the art that the operations, methods, steps in the flows, measures and solutions already discussed in the present disclosure may be alternated, changed, combined or deleted. Further, the operations, methods, other steps in the flows, measures and solutions already discussed in the present disclosure may also be alternated, changed, rearranged, decomposed, combined or deleted. Further, prior arts having the operations, methods, the steps in the flows, measures and solutions already discussed in the present disclosure may also be alternated, changed, rearranged, decomposed, combined or deleted.

Only a part of embodiments of the present disclosure are described above. It should be noted that, for a person of ordinary skill in the art, various modifications and variations can be made without departure from the principle of the present disclosure. Such modifications and variations shall be regarded as falling in the claimed scope of the present disclosure.

The invention claimed is:

1. A method performed by a terminal in a wireless communication system, the method comprising:
   receiving, from a base station, a first synchronization signal/physical broadcast channel (SS/PBCH) block in a first transmission window;
   receiving, from the base station, a second SS/PBCH block in a second transmission window, wherein each of the first transmission window and the second transmission window is set in units of half frames; and
   identifying a quasi-co-located (QCL) relationship between the first SS/PBCH block and the second SS/PBCH block based on an index associated with the first SS/PBCH block, an index associated with the second SS/PBCH block and a value associated with a number of SS/PBCH blocks,
   wherein the value associated with the number of SS/PBCH blocks is indicated by higher layer signaling, and
   wherein the identifying the QCL relationship between the first SS/PBCH block and the second SS/PBCH block comprises:
   determining that a result of a modulo operation between the index associated with the first SS/PBCH block and the value associated with the number of SS/PBCH blocks is the same as a result of a modulo operation between the index associated with the second SS/PBCH block and the value associated with the number of SS/PBCH blocks, and
   identifying that the first SS/PBCH block and the second SS/PBCH block are in the QCL relationship based on the determination.

2. The method of claim 1, wherein the value associated with the number of SS/PBCH blocks indicates a value associated with a number of SS/PBCH blocks transmitted in a transmission window.

3. The method of claim 1, wherein the QCL relationship indicates that the first SS/PBCH block and the second PBCH block is received via same beam.

4. The method of claim 1, further comprising:
   determining an index of the first SS/PBCH block based on a modulo operation between an index of a candidate SS/PBCH block within the first transmission window and the value associated with the number of SS/PBCH blocks.

5. The method of claim 1, wherein a number of SS/PBCH blocks transmitted in the first transmission window or the second transmission window is equal or smaller than the value associated with the number of SS/PBCH blocks.

6. The method of claim 1, wherein an index of a candidate SS/PBCH block within the first transmission window is determined as 3 least significant bits (LSBs), the 3 LSBs are indicated by DM-RS sequence transmitted in PBCH.

7. A terminal in a wireless communication system, the terminal comprising:
   a transceiver; and
   at least one processor configured to:
   receive via the transceiver, from a base station, a first synchronization signal/physical broadcast channel (SS/PBCH) block in a first transmission window,
   receive via the transceiver, from the base station, a second SS/PBCH block in a second transmission window, wherein each of the first transmission window and the second transmission window is set in units of half frames, and
   identify a quasi-co-located (QCL) relationship between the first SS/PBCH block and the second SS/PBCH block based on an index associated with the first SS/PBCH block, an index associated with the second SS/PBCH block and a value associated with a number of SS/PBCH blocks,
   wherein the value associated with the number of SS/PBCH blocks is indicated by higher layer signaling, and
   wherein, to identify the QCL relationship between the first SS/PBCH block and the second SS/PBCH block, the at least one processor is further configured to:
   determine that a result of a modulo operation between the index associated with the first SS/PBCH block and the value associated with the number of SS/PBCH blocks is the same as a result of a modulo operation between the index associated with the second SS/PBCH block and the value associated with the number of SS/PBCH blocks, and
   identify that the first SS/PBCH block and the second SS/PBCH block are in the QCL relationship based on the determination.

8. The terminal of claim 7, wherein the value associated with the number of SS/PBCH blocks indicates a value associated with a number of SS/PBCH blocks transmitted in a transmission window.

9. The terminal of claim 7, wherein the QCL relationship indicates that the first SS/PBCH block and the second PBCH block is received via same beam.

10. The terminal of claim 7, wherein the at least one processor is further configured to:
   determine an index of the first SS/PBCH block based on a modulo operation between an index of a candidate SS/PBCH block within the first transmission window and the value associated with the number of SS/PBCH blocks.

11. The terminal of claim 7, wherein a number of SS/PBCH blocks transmitted in the first transmission window or the second transmission window is equal or smaller than the value associated with the number of SS/PBCH blocks.

12. The terminal of claim 7, wherein an index of a candidate SS/PBCH block within the first transmission window is determined as 3 least significant bits (LSBs), the 3 LSBs are indicated by DM-RS sequence transmitted in PBCH.

* * * * *